(12) United States Patent
Lei et al.

(10) Patent No.: US 11,552,750 B2
(45) Date of Patent: Jan. 10, 2023

(54) SUBBAND-BASED RANDOM ACCESS AND SCHEDULING REQUEST FOR NEW-RADIO-SPECTRUM SHARING (NR-SS)

(71) Applicant: QUALCOMM Incorporated, San Diego, CA (US)

(72) Inventors: Jing Lei, San Diego, CA (US); Jing Sun, San Diego, CA (US); Tamer Kadous, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 16/218,345

(22) Filed: Dec. 12, 2018

(65) Prior Publication Data
US 2019/0190668 A1  Jun. 20, 2019

Related U.S. Application Data

(60) Provisional application No. 62/599,530, filed on Dec. 15, 2017.

(51) Int. Cl.
*H04L 5/00* (2006.01)
*H04W 72/12* (2009.01)
(Continued)

(52) U.S. Cl.
CPC ............ *H04L 5/001* (2013.01); *H04L 1/0017* (2013.01); *H04L 5/003* (2013.01); *H04L 5/0046* (2013.01); *H04L 5/0094* (2013.01); *H04L 27/2646* (2013.01); *H04L 27/2692* (2013.01); *H04W 72/1278* (2013.01); *H04W 74/085* (2013.01); *H04L 5/0007* (2013.01);
(Continued)

(58) Field of Classification Search
CPC . H04L 1/0017; H04L 27/264; H04L 27/2646; H04L 27/2692; H04L 5/0046; H04L 5/001; H04L 5/003; H04L 5/0094; H04L 5/0007; H04L 5/0035; H04W 72/1284; H04W 72/1278; H04W 74/085; H04W 74/0808; H04W 74/0833
See application file for complete search history.

(56) References Cited

U.S. PATENT DOCUMENTS 10,104,693 B1 * 10/2018 Zhang .................. H04W 72/06
10,123,350 B2 * 11/2018 Ye ....................... H04W 74/0808
(Continued)

OTHER PUBLICATIONS

International Search Report and Written Opinion—PCT/US2018/065467—ISA/EPO—dated Feb. 20, 2019.

*Primary Examiner* — Jasper Kwoh
(74) *Attorney, Agent, or Firm* — Liem T. Do

(57) ABSTRACT

Wireless communications systems and methods related to performing subband-based random access and/or subband-based scheduling request in a network are provided. A first wireless communication device receives a communication configuration indicating one or more subbands for transmitting a signal including at least one of a random access preamble sequence or a scheduling request. The first wireless communication device performs a clear channel assessment (CCA) on each subband of the one or more subbands. The first wireless communication device transmits the signal using at least one subband of the one or more subbands based on a result of the CCA.

28 Claims, 18 Drawing Sheets

(51) Int. Cl.
*H04L 1/00* (2006.01)
*H04L 27/26* (2006.01)
*H04W 74/08* (2009.01)

(52) U.S. Cl.
CPC ....... *H04L 5/0035* (2013.01); *H04W 72/1284* (2013.01); *H04W 74/0808* (2013.01); *H04W 74/0833* (2013.01)

(56) References Cited

U.S. PATENT DOCUMENTS

| | | | |
|---|---|---|---|
| 10,271,325 B2* | 4/2019 | Mukherjee | H04W 74/0816 |
| 10,484,154 B2* | 11/2019 | Li | H04L 5/0048 |
| 10,548,167 B2* | 1/2020 | Ahn | H04W 74/0808 |
| 10,568,141 B2* | 2/2020 | Ahn | H04W 72/1278 |
| 2012/0236876 A1* | 9/2012 | Vijayasankar | H04B 3/54 |
| | | | 370/461 |
| 2013/0136075 A1* | 5/2013 | Yu | H04L 1/0643 |
| | | | 370/329 |
| 2016/0021661 A1 | 1/2016 | Yerramalli et al. | |
| 2016/0100407 A1 | 4/2016 | Gaal et al. | |
| 2016/0344526 A1* | 11/2016 | Fan | H04L 5/0091 |
| 2017/0048047 A1 | 2/2017 | Kadous et al. | |
| 2017/0099679 A1 | 4/2017 | Zhang et al. | |
| 2017/0142235 A1* | 5/2017 | Zhang | H04L 5/001 |
| 2017/0150523 A1 | 5/2017 | Patel et al. | |
| 2017/0332409 A1 | 11/2017 | Yerramalli et al. | |
| 2020/0120720 A1* | 4/2020 | Wu | H04W 72/04 |

\* cited by examiner

SUBBAND-BASED RANDOM ACCESS AND SCHEDULING REQUEST FOR NEW-RADIO-SPECTRUM SHARING (NR-SS)

CROSS REFERENCE TO RELATED APPLICATIONS

The present application claims priority to and the benefit of the U.S. Provisional Patent Application No. 62/599,530, filed Dec. 15, 2017, which is hereby incorporated by reference in its entirety as if fully set forth below and for all applicable purposes.

TECHNICAL FIELD

This application relates to wireless communication systems and methods, and more particularly to performing subband-based random access and/or subband-based scheduling request in a network operating over a frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

In a radio access network such as an NR network, a BS may configure resources for random access and/or scheduling request to enable UEs to access the network without transmission grants. A UE may perform random access in various scenarios. In some instances, a UE may perform random access to establish a connection during an initial network access. Subsequently, the UE may perform random access to re-establish a connection with a BS after a radio link failure. In addition, the UE may perform random access to establish or re-establish uplink synchronization with a BS after a synchronization loss. Further, the UE may perform random access when timing advance is needed in a positioning procedure. In some other instances, a UE may transmit an uplink scheduling request to a BS without having an uplink transmission grant, for example, after the UE is synchronized to the BS and the UE's identity is known to the BS.

When a network operates in a shared medium (e.g., an unlicensed spectrum in sub-6 GHz bands), collisions may occur among nodes sharing the medium. One approach to avoiding collisions is to perform listen-before-talk (LBT) or clear channel assessment (CCA) to ensure that the shared channel is clear before transmitting a synchronization signal. However, a BS and a UE may be located at different geographical locations. As such, the BS and the UE may experience different interferences from different incumbents located in surrounding areas of the BS and the UE. As such, the outcomes of the LBT or CCA at the BS and at the UE may be different. Accordingly, improved procedures for random access and/or scheduling request are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, comprising receiving, by a first wireless communication device, a communication configuration indicating one or more subbands for transmitting a signal including at least one of a random access preamble sequence or a scheduling request; performing, by the first wireless communication device, a clear channel assessment (CCA) on each subband of the one or more subbands; and transmitting, by the first wireless communication device, the signal using at least one subband of the one or more subbands based on a result of the CCA.

In an additional aspect of the disclosure, a method of wireless communication, comprising performing, by a first wireless communication device, a clear channel assessment (CCA) on each subband of a plurality of subbands; transmitting, by the first wireless communication device, a communication configuration indicating a subset of the plurality of subbands based on a result of the CCA, the subset of the plurality of subbands for at least one of a random access preamble signal transmission or a scheduling request transmission; monitoring, by the first wireless communication device, the subset of the plurality of subbands based on the communication configuration; and detecting, by the first wireless communication device, a signal including at least one of a random access preamble sequence or a scheduling request from a second wireless communication device in at least one subband of the subset of the plurality of subbands, based on the monitoring.

In an additional aspect of the disclosure, an apparatus comprising a transceiver configured to receive a communication configuration indicating one or more subbands for transmitting a signal including at least one of a random access preamble sequence or a scheduling request; and transmit the signal using at least one subband of the one or more subbands based on a result of a clear channel assessment (CCA); and a processor configured to perform the clear channel assessment (CCA) on each subband of the one or more subbands.

In an additional aspect of the disclosure, an apparatus comprising a transceiver configured to transmit a communication configuration indicating a subset of a plurality of subbands based on a result of a clear channel assessment (CCA), the subset of the plurality of subbands for at least one of a random access preamble signal transmission or a scheduling request transmission; and a processor configured to perform the CCA on each subband of a plurality of subbands; monitor the subset of the plurality of subbands based on the communication configuration; and detect a signal including at least one of a random access preamble sequence or a scheduling request from a second wireless communication device in at least one subband of the subset of the plurality of subbands based on the monitoring.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
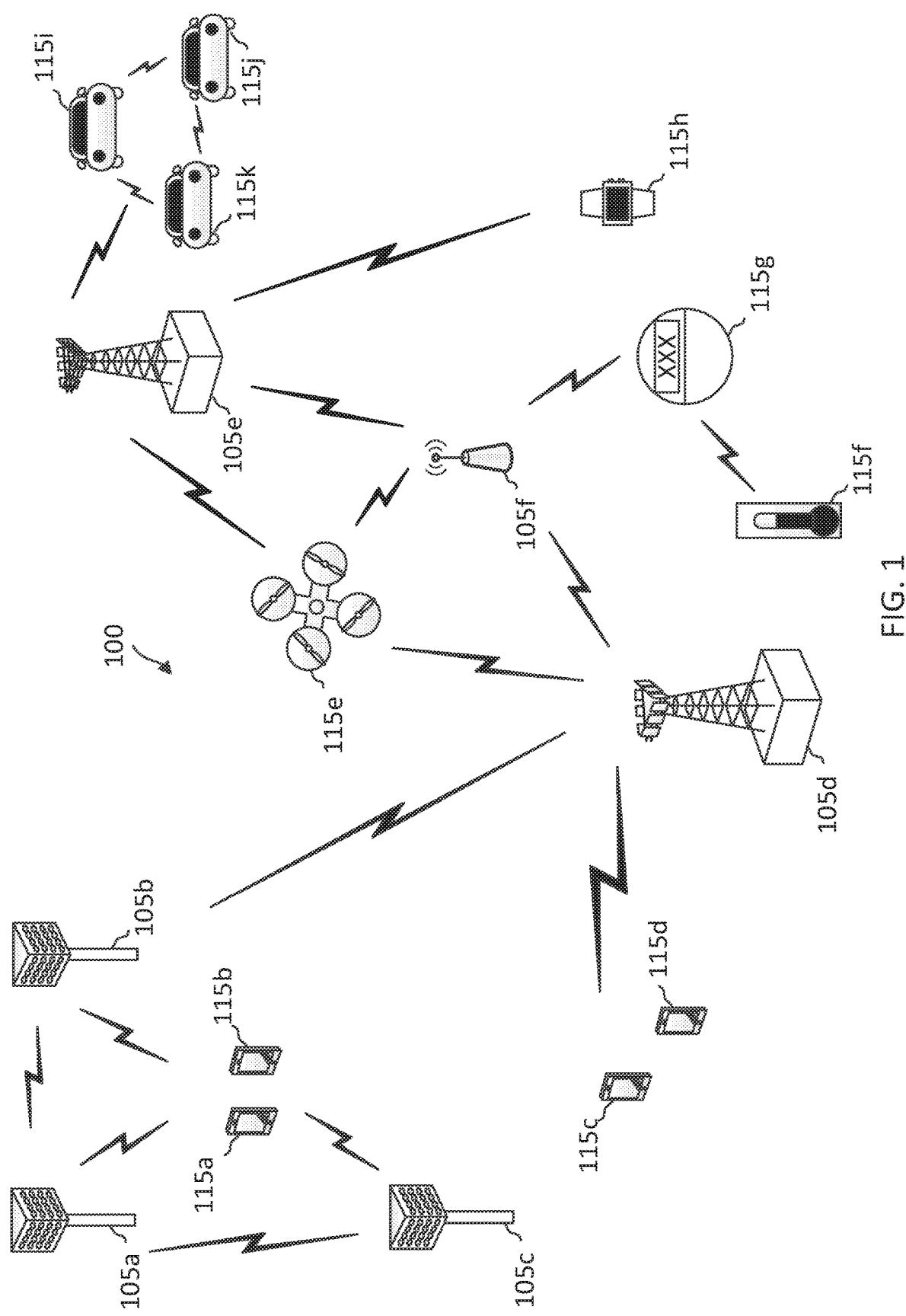
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for performing subbband-based random access and/or subband-based scheduling request in a network operating over a frequency spectrum shared by multiple network operating entities. The disclosed embodiments allocate resources for random network access and/or scheduling requests in frequency subbands within a shared frequency spectrum. For example, a BS may perform a clear channel assessment (CCA) on each subband and select the subbands that pass the CCA for random access transmissions and/or scheduling request transmissions. The BS can broadcast a configuration indicating the selected subbands. A UE may receive the configuration and may perform a CCA on each of the subbands indicated in the configuration. The UE may select one or more of the subbands indicated in the configuration and may transmit a random access preamble signal or a scheduling request signal using the selected subbands.

According to some embodiments of the present disclosure, the configuration can further include random access preamble sequence generation information (e.g., sequence length, sequence indices, tone spacing, and/or sequence format. The configuration can further include resource partition information (e.g., FDM resources within subbands, frequency interlaces within subbands, and/or frequency tone groups within subbands). The configuration can further indicate information associated with time bundling, frequency hopping, power scaling, and/or orthogonal cover codes (OCCs) that may be used for random access preamble signal transmission and/or scheduling request transmissions.

Aspects of the present application can provide several benefits. For example, the CCAs performed at a BS prior to configuring resources and the CCAs performed at a UE after receiving the resource configuration can reduce collisions with other nodes sharing the frequency spectrum. The use of subband-based resource allocations and communications allows the BS and the UE to select and use the subbands that pass the CCAs, and thus can improve random access and/or scheduling request performance and spectrum usage efficiency. The use of FDM resources, frequency interlaces, and frequency tone groups, and/or OCCs can increase random access and/or scheduling request transmission opportunities and/or capacities. The use of frequency interlaces can reduce transmission signal peak-to-power ratio (PAPR). The use of time bundling can improve random access and/or scheduling request performance under time-varying interference. The use of frequency hopping can improve random access and/or scheduling request under deep fading.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system bandwidth into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system bandwidth. The system bandwidth may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In an embodiment, the network 100 may be an NR network deployed over an unlicensed spectrum (e.g., in sub-6 GHz bands) shared by multiple network operating entities, which may operate using various wireless technologies such as WiFi, license assisted access (LAA), and MulteFire (MF). The multiple network operating entities may coordinate access to the spectrum. For example, different network operating entities may be assigned with different access priorities during time periods. Each transmitting node (e.g., the BSs 105 and the UEs 115) may perform medium sensing (e.g., listen-before-talk (LBT) or clear channel assessment (CCA)) prior to transmissions in the spectrum to avoid or minimize collisions with other nodes sharing the spectrum. A target receiving node (e.g., the BSs 105 and the UEs 115) may also perform medium sensing to feedback interference profile information to a target transmitting node to further improve spectrum sharing performance Mechanisms for coordinating access to a spectrum shared by multiple network operating entities are described in greater detail herein.

When the network 100 operates over a shared channel, communications between the BSs 105 and the UEs 115 may occur over multiple subbands. For example, the system bandwidth may be divided into multiple subband units having the same timing relationship and duplex modes between subbands (e.g., 20 MHz/subband, 15 MHz/subband, etc.). The BSs 105 may transmit a discovery reference signal (DRS) in one or more subbands to provide network configuration information to facilitate communications with the UEs 115. The DRS may carry network configuration signals and information substantially similar to the PSS, SSS, MIBs, RMSI, and/or OSI described above, but may include additional information specific to spectrum sharing. For example, a BS 105 may transmit a DRS including a subband-based random access resource configuration indicating random access resources. The BS 105 may determine random access resources based on outcomes (e.g., channel clearances) of CCA performed at the BS 105. A UE 115 may perform initial random access based on random access resource configurations received from the BS 105 and outcomes of CCA performed at the UE 115. Subsequently, the BS 105 may initiate a CCA prior to transmitting on the shared channel, while the UE 115 may perform CCA based on a dynamic trigger and/or a semi-persistent configuration from the BS 105. In some embodiments, mechanisms similar to the random access may be used for scheduling requests. Mechanisms for random access and scheduling request are described in greater detail herein.

Figure 2:
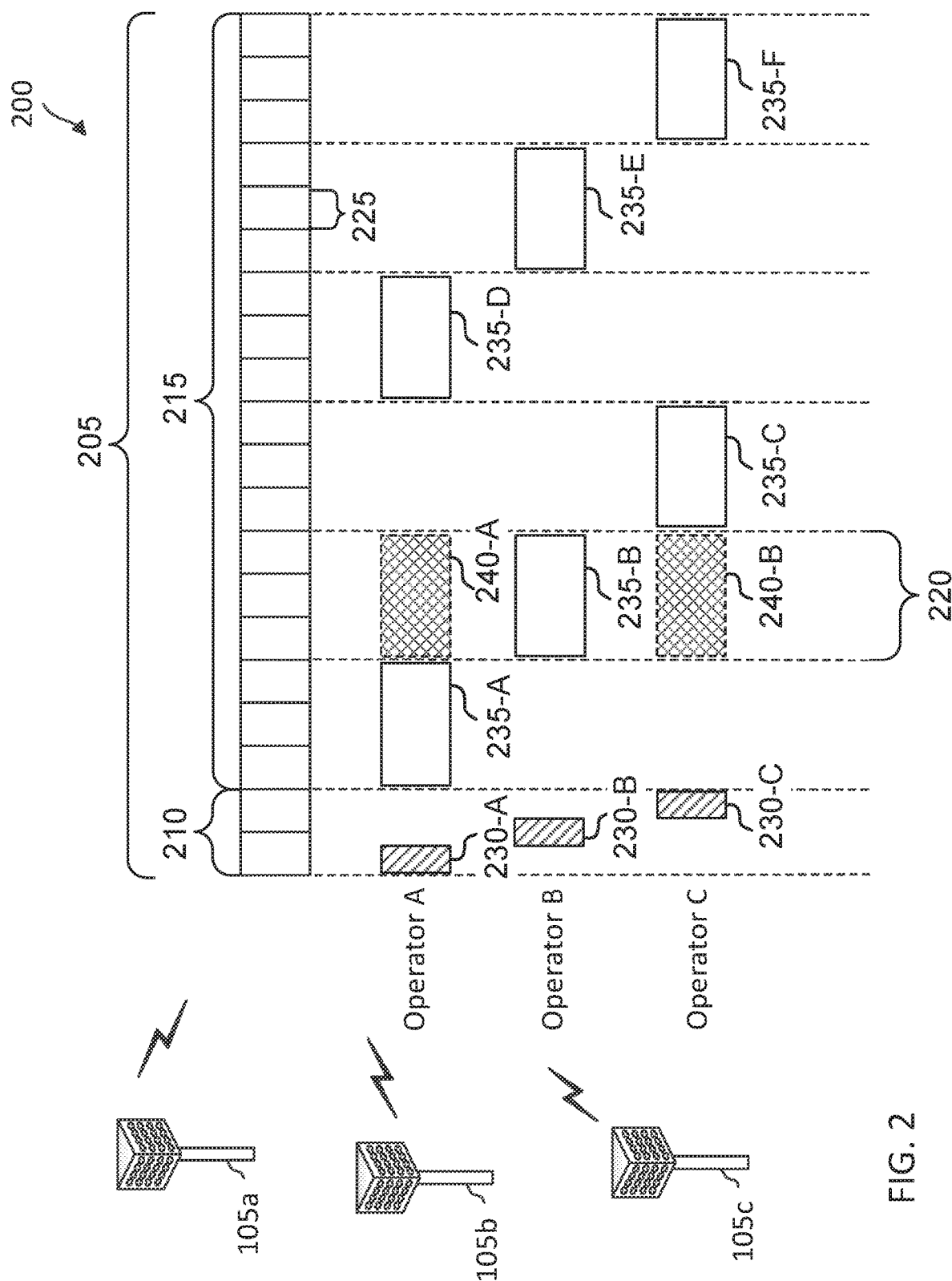
FIG. 2 is a time diagram illustrating an example of a coordinated resource partitioning scheme according to some embodiments of the present disclosure.

FIG. 2 is a time diagram illustrating an example of a coordinated resource partitioning scheme 200 according to some embodiments of the present disclosure. The timing diagram includes a superframe 205, which may represent a fixed duration of time (e.g., 20 ms). Superframe 205 may be repeated for a given communication session and may be used by a wireless system such as the network 100 described with reference to FIG. 1. The superframe 205 may be divided into intervals such as an acquisition interval (A-INT) 210 and an arbitration interval 215. As described in more detail below, the A-INT 210 and arbitration interval 215 may be subdivided into sub-intervals, designated for certain resource types, and allocated to different network operating entities to facilitate coordinated communications between the different network operating entities. For example, the arbitration interval 215 may be divided into a plurality of sub-intervals 220. In some instances, the sub-intervals 220 may be referred to as transmission opportunities (TXOPs). Also, the superframe 205 may be further divided into a plurality of subframes 225 with a fixed duration (e.g., 1 ms). While timing diagram 200 illustrates three different network operating entities (e.g., Operator A, Operator B, Operator C), the number of network operating entities using the superframe 205 for coordinated communications may be greater than or fewer than the number illustrated in timing diagram 200.

The A-INT 210 may be a dedicated interval of the superframe 205 that is reserved for exclusive communications by the network operating entities. In some examples, each network operating entity may be allocated certain resources within the A-INT 210 for exclusive communications. For example, resources 230-*a* may be reserved for exclusive communications by Operator A, such as through BS 105*a*, resources 230-*b* may be reserved for exclusive communications by Operator B, such as through BS 105*b*, and resources 230-*c* may be reserved for exclusive communications by Operator C, such as through BS 105*c*. Since the resources 230-*a* are reserved for exclusive communications by Operator A, neither Operator B nor Operator C can communicate during resources 230-*a*, even if Operator A chooses not to communicate during those resources. That is, access to exclusive resources is limited to the designated network operator. Similar restrictions apply to resources 230-*b* for Operator B and resources 230-*c* for Operator C. The wireless nodes of Operator A (e.g, UEs 115 or BSs 105) may communicate any information desired during their exclusive resources 230-*a*, such as control information or data.

When communicating over an exclusive resource, a network operating entity does not need to perform any medium sensing procedures (e.g., LBT or CCA) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 210 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 235-*a* may be prioritized for use by Operator A and may therefore be referred to as a G-INT for Operator A (e.g., G-INT-OpA). Similarly, resources 235-*b* may be prioritized for Operator B, resources 235-*c* may be prioritized for Operator C, resources 235-*d* may be prioritized for Operator A, resources 235-*e* may be prioritized for Operator B, and resources 235-*f* may be prioritized for operator C.

The various G-INT resources illustrated in FIG. 2 appear to be staggered to illustrate their association with their respective network operating entities, but these resources may all be on the same frequency bandwidth. Thus, when viewed along a time-frequency grid, the G-INT resources may appear as a contiguous line within the superframe 205. This partitioning of data may be an example of time division multiplexing (TDM). Also, when resources appear in the same sub-interval (e.g., resources 240-*a* and resources 235-*b*), these resources represent the same time resources with respect to the superframe 205 (e.g., the resources occupy the same sub-interval 220), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 235-*a* without interference from the wireless nodes of Operator B or Operator C.

A network operating entity may additionally signal to another operator that it intends to use a particular G-INT. For example, referring to resources 235-*a*, Operator A may signal to Operator B and Operator C that it intends to use resources 235-*a*. Such signaling may be referred to as an activity indication. Moreover, since Operator A has priority over resources 235-*a*, Operator A may be considered as a higher priority operator than both Operator B and Operator C. However, as discussed above, Operator A does not have to send signaling to the other network operating entities to ensure interference-free transmission during resources 235-*a* because the resources 235-*a* are assigned with priority to Operator A.

Similarly, a network operating entity may signal to another network operating entity that it intends not to use a particular G-INT. This signaling may also be referred to as an activity indication. For example, referring to resources 235-*b*, Operator B may signal to Operator A and Operator C that it intends not to use the resources 235-*b* for communication, even though the resources are assigned with priority to Operator B. With reference to resources 235-*b*, Operator B may be considered a higher priority network operating entity than Operator A and Operator C. In such cases, Operators A and C may attempt to use resources of sub-interval 220 on an opportunistic basis. Thus, from the perspective of Operator A, the sub-interval 220 that contains resources 235-*b* may be considered an opportunistic interval (O-INT) for Operator A (e.g., O-INT-OpA). For illustrative purposes, resources 240-*a* may represent the O-INT for Operator A. Also, from the perspective of Operator C, the same sub-interval 220 may represent an O-INT for Operator C with corresponding resources 240-*b*. Resources 240-*a*, 235-*b*, and 240-*b* all represent the same time resources (e.g., a particular sub-interval 220), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, when Operator B decides not to use resources 235-*b* (e.g., G-INT-OpB), then Operator A may use those same resources (e.g., represented by resources 240-*a*) by first checking the channel for interference (e.g., LBT) and then transmitting data when the channel was determined to be clear. Similarly, when Operator C wanted to access resources on an opportunistic basis during sub-interval 220 (e.g., use an O-INT represented by resources 240-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources when multiple operators are attempting access simultaneously.

In some examples, a network operating entity may intend not to use a particular G-INT assigned to it, but may not send out an activity indication that conveys the intent not to use the resources. In such cases, for a particular sub-interval 220, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 2, each sub-interval 220 includes a G-INT for one of Operator A, B, or C. However, in some cases, one or more sub-intervals 220 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 225 may contain 14 symbols (e.g., 250-μs for 60 kHz tone spacing). These subframes 225 may be standalone, self-contained Interval-Cs (ITCs) or the subframes 225 may be a part of a long ITC. An ITC may be a self-contained transmission starting with a downlink transmission and ending with a uplink transmission. In some embodiments, an ITC may contain one or more subframes 225 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 2, it should be understood that fewer or more network operating entities may be configured to operate in a coordinated manner as described above. In some cases, the location of the G-INT, O-INT, or A-INT within superframe 205 for each operator is determined autonomously based on the number of network operating entities active in a system. For example, when there is only one network operating entity, each sub-interval 220 may be occupied by a G-INT for that single network operating entity, or the sub-intervals 220 may alternate between G-INTs for that network operating entity and O-INTs to allow other network operating entities to enter. If there are two network operating entities, the sub-intervals 220 may alternate between G-INTs for the first network operating entity and G-INTs for the second network operating entity. If there are three network operating entities, the G-INT and O-INTs for each network operating entity may be designed as illustrated in FIG. 2. If there are four network operating entities, the first four sub-intervals 220 may include consecutive G-INTs for the four network operating entities and the remaining two sub-intervals 220 may contain O-INTs. Similarly, when there are five network operating entities, the first five sub-intervals 220 may contain consecutive G-INTs for the five network operating entities and the remaining sub-interval 220 may contain an O-INT. If there are six network operating entities, all six sub-intervals 220 may include consecutive G-INTs for each network operating entity. It should be understood that these examples are for illustrative purposes only and that other autonomously determined interval allocations may be used.

It should be understood that the coordination framework described with reference to FIG. 2 is for illustration purposes only. For example, the duration of superframe 205 may be more or less than 20 ms. Also, the number, duration, and location of sub-intervals 220 and subframes 225 may differ from the configuration illustrated. Also, the types of resource designations (e.g., exclusive, prioritized, unassigned) may differ or include more or less sub-designations.

Within 5G systems such as the network 100, the LBT procedure may be used to sense channel use prior to transmitting on a shared communication channel. In general, an LBT procedure provides for a transmitting node to perform a CCA check to evaluate the presence or absence of other signals on the shared channel. Such CCA checks may use at least an energy detection process to determine if interference detected on the shared channel rises to a level to be considered an actual signal using the channel Four categories of LBT procedures have been discussed for use in 5G systems. The first category of LBT (Cat-1) provides no LBT at all. In such Cat-1 LBT circumstances, the transmitter would simply begin to transmit. The second category of LBT (Cat-2) provides for performing an LBT, such as through a CCA, only without a random back-off or contention window. Such, shortened Cat-2 LBTs result in a quick check of the channel prior to beginning transmissions. The Cat-2 LBT may also be referred to as the 25 μs LBT. The third category of LBT (Cat-3) provides for performing an LBT procedure with both a random back-off value and a fixed contention window. The fourth category of LBT (Cat-4) provides for performing an LBT procedure with both a random back-off value and a variable contention window. In both Cat-3 and Cat-4 LBT, the transmitter selects a random number for the back-off value and performs the LBT or CCA check when the random back-off has passed. However, in Cat-3 the contention window size is fixed, while it is variable in Cat-4.

Figure 3:
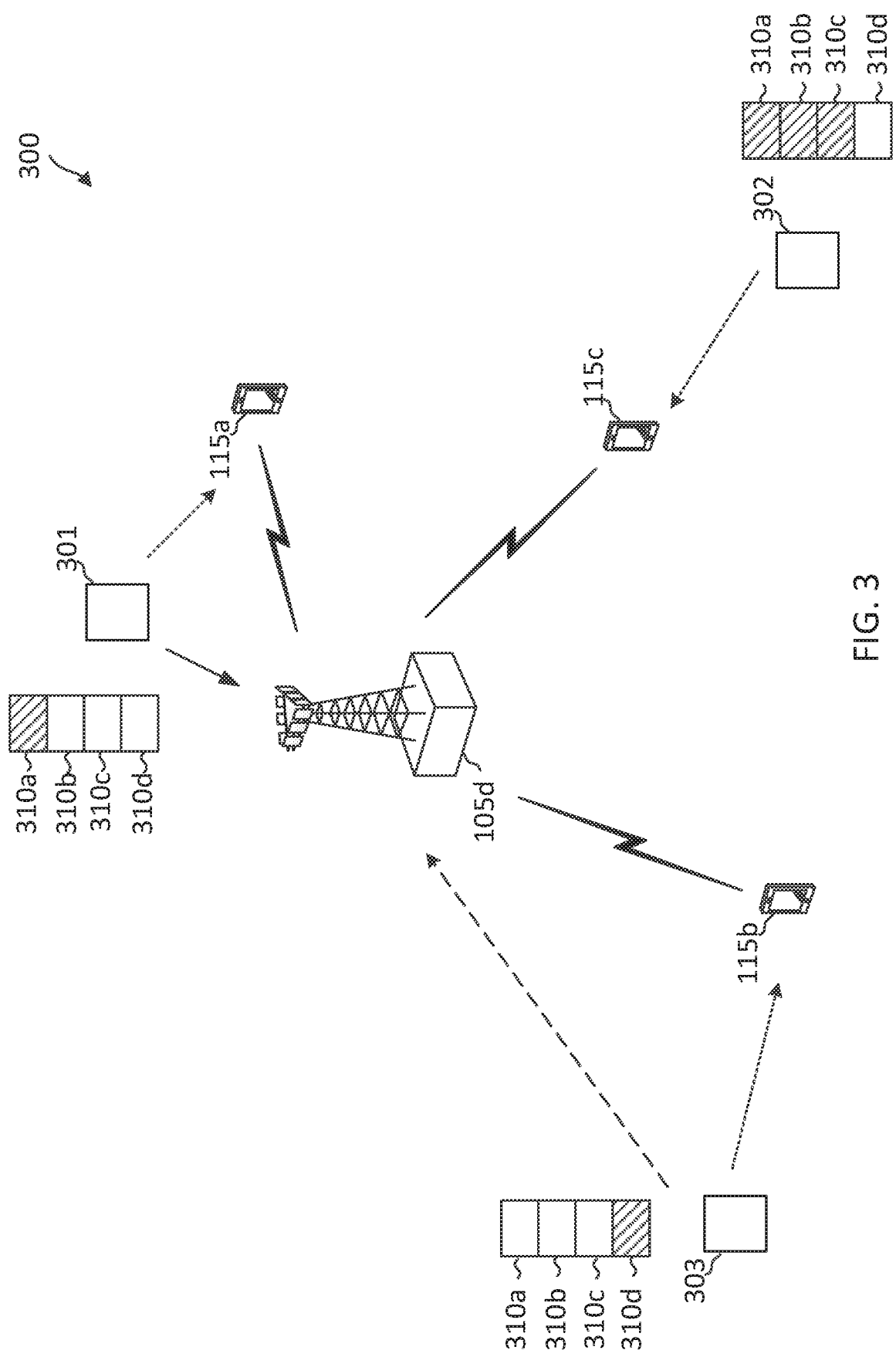
FIG. 3 illustrates a wireless communication network according to some embodiments of the present disclosure.

FIG. 3 illustrates a wireless communication network 300 according to some embodiments of the present disclosure. The network 200 may correspond to a portion of the network 100. The network 200 may be deployed over an unlicensed band. In the network 200, the BSs 105 and the UEs 115 may use LBT procedures prior to transmitting on the shared communication channel. The LBT procedure, such as a CCA, may be performed per subband. In one example implementation for a 5 GHz band, a typical subband bandwidth may be about 20 MHz. One of the challenges for multi-band uplink communications is that the interference profile observed by a BS may differ from those of its served UEs. The differing interference profiles may arise based on the BS and UE adopting different LBT schemes (e.g., energy detection based vs. preamble detection based) and/or using different CCA thresholds. A trade off may exist in UE LBT between reliability and efficiency of uplink transmissions with signaling overhead and power consumption. For example, a UE may adopt an energy detection LBT to reduce the complexity and overhead that would be present with a preamble detection LBT The resulting signaling overhead and power consumption may be more favorable to the UE, while the uplink transmission reliability and efficiency may be less. Because the BSs would not typically have overhead and power considerations, they may perform preamble detection, which increases the complexity and overhead, but yields a more reliable and efficient transmission. Thus, the interference environment at the BS 105*d* and the UEs 115*a*-115*c* may be different.

As shown, the BS 105*d* serves the UEs 115*a*-115*c* with access provided to the shared communications channel via four subbands 310, including 310*a*, 310*b*, 310*c*, and 310*d*. The subbands 310 may be 20 MHz bands. The LBT schemes and locations of different interfering nodes may cause the LBT results for the BS 105*d* to be different from the LBT results of the UEs 115*a*-115*c*. For example, a network node 301 in the network 300 may cause strong interference to both the BS 105*d* and the UE 115*a*, but only on one of the subbands 310 (e.g., the subband 310*a*). Thus, a CCA performed by the BS 105*d* and a CCA performed by the UE 115*a* for uplink communication from the UE 115*a* may have the same results. Another network node 302 in the network 300 may cause strong interference, but only to the UE 115*c* over the subbands 310*a*, 310*b*, and 310*c*. The BS 105*d* is unlikely to detect the interference from network node 302. Thus, a CCA performed by the BS 105*d* and a CCA performed by the UE 115*c* may have conflicting results, as the UE 115*c* may experience the strong interference on the subbands 310*a*, 310*b*, and 310*c* from network node 302. Yet another network node 303 in the network may cause strong interference the UE 115*b* over the subband 310*d*, but may only cause weak interference to the BS 105*d*. Accordingly, the outcomes or results of CCAs performed by the BS 105*d* may be different from the outcomes or results of CCAs performed by the UE 115*b*.

As can be seen, the BS 105*d* may not have knowledge of CCA outcomes of the UEs 115*a*-115*c* ahead of time. Thus, while the BSs and UEs perform CCAs prior to transmissions, the mismatching interference profiles of the BSs and the UEs can cause collisions, miss detections, and a waste of radio resources. Various aspects of the present disclosure are directed to facilitating random access and scheduling requests in a multi-band NR-SS system.

Figure 4:
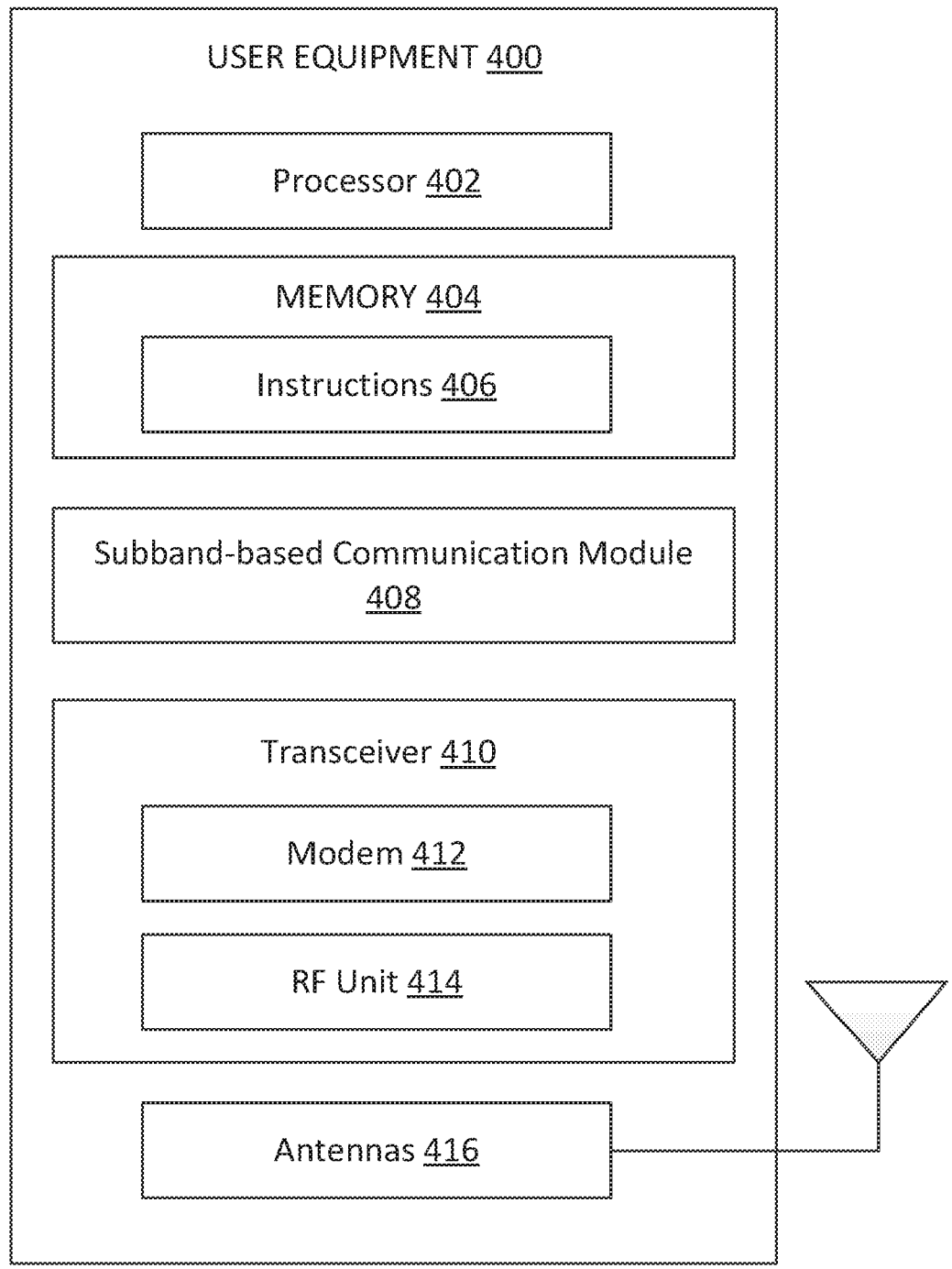
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 as discussed above. As shown, the UE 200 may include a processor 402, a memory 404, a subband-based communication module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure, for example, aspects of FIG. 6-18. Instructions 406 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The subband-based communication module 408 may be implemented via hardware, software, or combinations thereof. For example, the subband-based communication module 408 may be implemented as a processor, circuit, and/or instructions 406 stored in the memory 404 and executed by the processor 402. The subband-based communication module 408 may be used for various aspects of the present disclosure. For example, the subband-based communication module 408 is configured to receive a subband-specific or subband-based communication configuration identifying resources in a plurality of subbands (e.g., the subbands 310) and/or sequence generation information, perform a CCA on each of the subbands, select one or more subbands based on the outcomes of the CCAs, a power constraint, an interference measurement, and/or a pathloss measurement, transmit a random access preamble signal or a scheduling request signal in the selected one or more subbands, and/or perform open loop or close loop power control for the transmissions of the random access preamble signal and the scheduling request signal, as described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the subband-based communication module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of communication signals transmitting random access preamble signals and/or scheduling request signal using subbands according to embodiments of the present disclosure. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
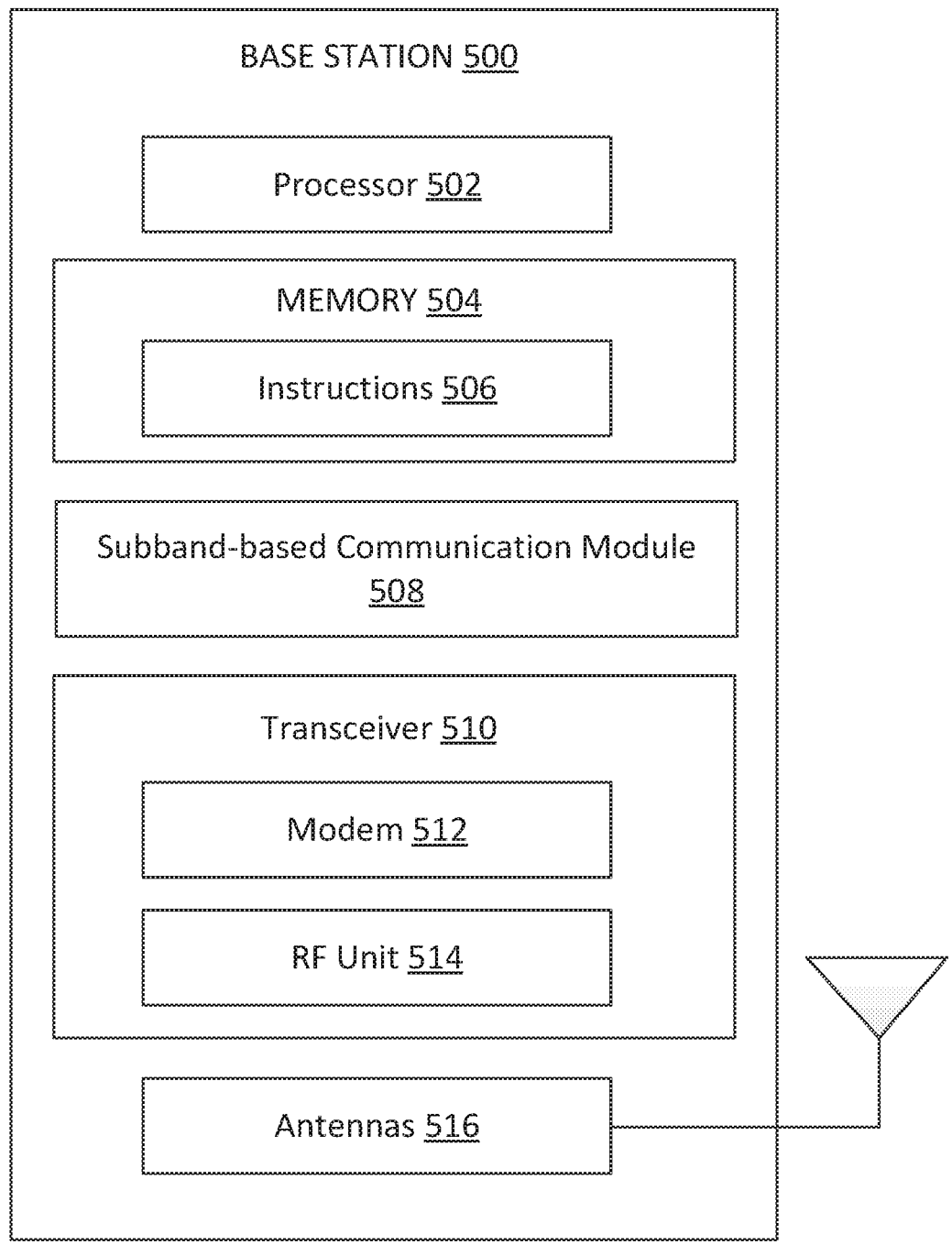
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 as discussed above. A shown, the BS 500 may include a processor 502, a memory 504, a subband-based communication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIG. 6-18. Instructions 506 may also be referred to as code, which may be interpreted broadly to include any type of computer-readable statement(s) as discussed above with respect to FIG. 4.

The subband-based communication module 508 may be implemented via hardware, software, or combinations thereof. For example, the subband-based communication module 508 may be implemented as a processor, circuit, and/or instructions 506 stored in the memory 504 and executed by the processor 502. The subband-based communication module 508 may be used for various aspects of the present disclosure. For example, the subband-based communication module 508 is configured to perform a CCA on each subband of a plurality of candidate subbands (e.g., the subbands 310), select one or more subbands for random access or scheduling request based on the outcomes of the CCAs, a coverage area, network traffic loading, and/or quality of service (QoS) requirements, broadcast a subband-specific or subband-based configuration indicating the selected resources, monitor for a random access preamble signal or a scheduling request from a UE (e.g., the UEs 115) in the selected subbands, perform a random access procedure with a UE based on a detected random access preamble signal from the UE, and/or perform UL scheduling based on a detected scheduling request from the UE, as described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
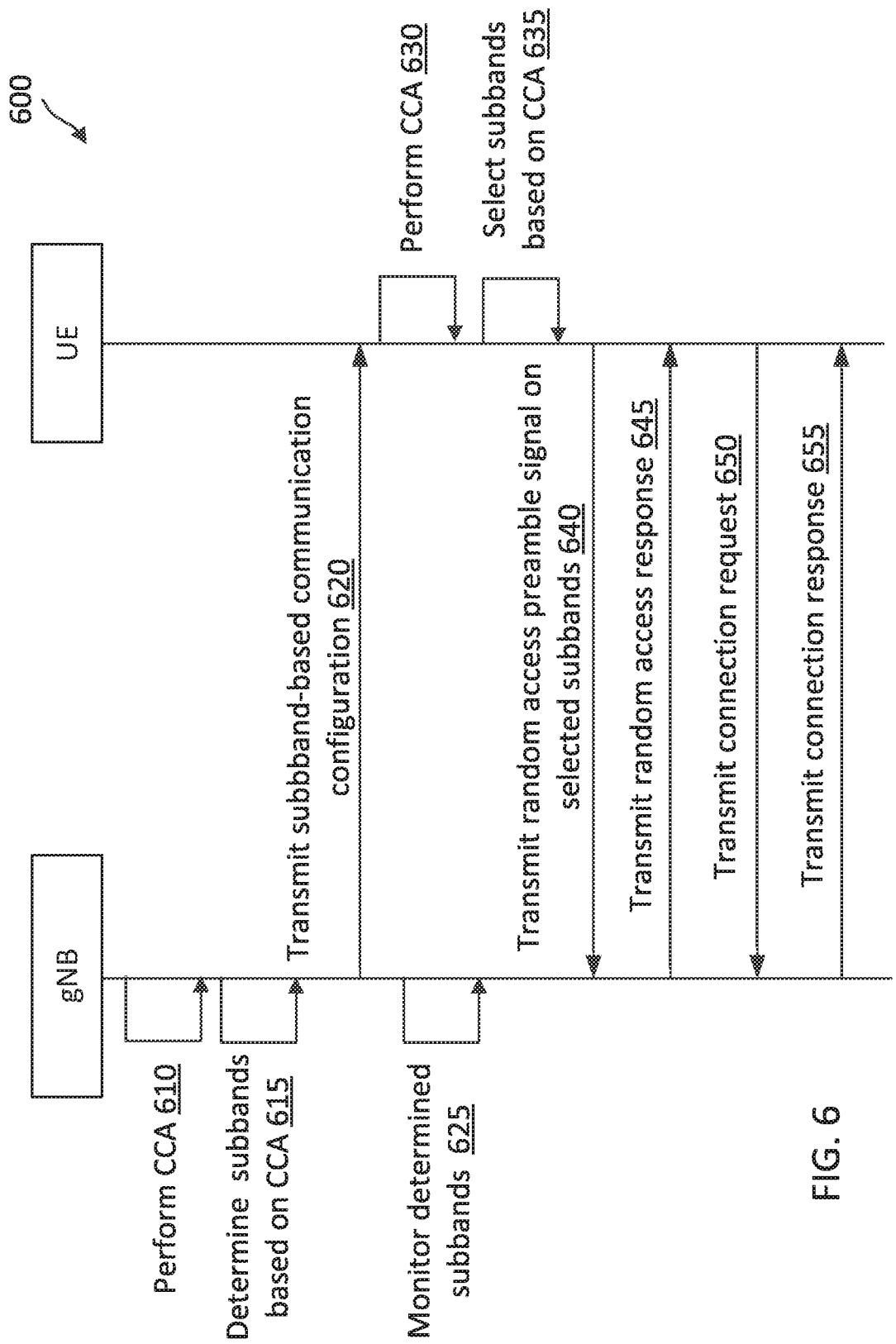
FIG. 6 is a signaling diagram of a subband-based communication method according to some embodiments of the present disclosure

FIG. 6 is a signaling diagram of a communication method 600 according to some embodiments of the present disclosure. The method 600 is implemented among a gNB and a UE in a network (e.g., the networks 100 and 300) operating over a medium shared by multiple network operating entities. The network may employ the coordinated access mechanisms described above with respect to FIG. 2 to access the medium. The BS may be similar to the BSs 105 and 500. The UE may be similar to the UEs 115 and 400. Steps of the method 600 can be executed by computing devices (e.g., a processor, processing circuit, and/or other suitable component) of the BS and the UE. As illustrated, the method 600 includes a number of enumerated steps, but embodiments of the method 600 may include additional steps before, after, and in between the enumerated steps. In some embodiments, one or more of the enumerated steps may be omitted or performed in a different order. While the method 600 is described in the context of performing a random network access, the method 600 may be applied for scheduling requests, for example, when a UE does not have an uplink grant from a gNB, but has uplink data ready for transmission to the gNB. In addition, the method 600 may include any suitable number of UEs (e.g., 2, 3, 4, and 5 or more).

At step 610, the gNB performs CCAs on the shared communication channel. For example, the shared communication channel is divided into multiple subbands (e.g., the subbands 310). The gNB may perform a CCA on each of the subband. For example, the gNB may listen to the channel for a transmission from another node, an interference level of the transmission, and/or an interference tolerance level of other nodes.

At step 615, the gNB determines a set of the subbands that pass the CCAs (e.g., have successful clearances) for random access use. In some embodiments, the gNB can further select the subbands based on a network traffic loading, a QoS requirement in the network, and/or a network coverage requirement.

At step 620, the gNB transmits a subband-based communication configuration indicating the set of subbands. In some embodiments, the gNB may broadcast the subband-based communication configuration in the network, for example, via RMSI in SSBs and/or DRSs during a time period within a TXOP (e.g., the sub-intervals 220). In an embodiment, the broadcast may be over a set of subbands and the set of subbands for random access may be associated with the set of subbands for the broadcast. For example, the random access subbands may be a subset of the broadcast subbands. In some embodiments, the gNB may transmit a physical downlink control channel (PDCCH) including the subband-based communication configuration in a group common PDCCH. A group common PDCCH may carry control information (e.g., UL and/or DL scheduling information) common to a group of UEs.

The subband-based communication configuration may include various information that a UE in the network may use for transmitting a random access preamble signal. For example, the subband-based communication configuration may provide information for generating and/or configuring a random access preamble sequence, which may be a Zadoff-Chu (ZC) sequence or any suitable known sequence. The subband-based communication configuration may indicate a physical random access channel (PRACH) sequence length, a subset of PRACH preamble indices, a subband-specific sequence selection scheme, a tone spacing, and/or a PRACH preamble format (e.g., indicating a duration of cyclic prefix (CP), a duration of the PRACH sequence, a sequence cyclic-shifting step size). In some instances, the gNB may select the subset of PRACH preamble indices as a function of buffer status reports (BSRs) received from UEs in the network, power head rooms of UEs in the network and/or the subband occupancy status. For example, a particular UE group may be assigned to use a particular subset of PRACH preamble indices. In some embodiments, the gNB may obtain information for subband occupancy and subsequent DL and/or UL scheduling based on a received PRACH preamble index.

The subband-based communication configuration may indicate whether time-based bundling and/or frequency-based bundling is allowed. Time-based bundling refers to the transmission of a random access preamble signal across multiple time periods. Frequency-based bundling refers to the transmission of a random access preamble signal across multiple subbands. The subband-based communication configuration may include a power scaling configuration, for example, indicating different power scaling factors for different time periods and/or different UEs.

The subband-based communication configuration may indicate orthogonal cover codes (OCCs) that may be used by multiple UEs to transmit random access preamble signals using the same set of resources. The OCCs may be applied in a time domain or a frequency domain, as described in greater detail herein.

The subband-based communication configuration may indicate frequency resources and/or time resources. For example, the communication configuration may indicate FDM resources, interlaces of frequency resources, and/or frequency tone groups in the subbands, as described in greater detail herein. The subband-based communication configuration may indicate resources in an uplink pilot time slot (UpPTS), a dedicated RACH slot, and/or a dedicated scheduling request slot.

The subband-based communication configuration may indicate contention-based resources or contention-free resources. Contention-based resources may be used by a UE to initiate an initial network access, a connection re-establishment after a radio link failure, and/or requesting for an UL transmission schedule. Contention-free resources may be after handover to a target cell, where the handover may be triggered by a BS detecting a UE at a cell-edge.

At step 625, the gNB may monitor the determined subbands based on the subband-based communication configuration.

At step 630, upon receiving the subband-based communication configuration, the UE performs a CCA on each of the subband in the set of random access subbands indicated in the subband-based communication configuration.

At step 635, the UE selects one or more subbands from the random access subbands based clearances or results of the CCAs, as described in greater detail herein. In some embodiments, the UE may further select the one or more subbands based on a power constraint (e.g., a power headroom) at the UE, an interference measurement, and/or a DL channel measurement (e.g., path loss). The UE may transmit in multiple subbands for which the CCAs are successful when the UE is not power-limited. The UE may determine the DL channel measurements based on a DRS, a channel state information-reference signal (CSI-RS), and/or a wideband demodulation reference signal (DMRS) received from the gNB.

At step 640, the UE transmits random access preamble signal on the selected subbands. The random access preamble may be generated and transmitted according to the received subband-based communication configuration.

At step 645, upon detecting the random access preamble signal, the gNB transmits a random access response. The random access response may include information such as scheduling information, timing advance information, power control information based on received random access preamble signal.

At step 650, the UE transmits a connection request based on the received random access response. At step 655, in response to the connection, the gNB transmits a connection response. The connection response may include scheduling information for a subsequent communication between the gNB and the UE.

In some instances, the random access preamble signal, the random access response, the connection request, and the connection response may be referred to as message 1, message 2, message 3, and message 4. In some instances, the steps of 650 and 650 may be omitted depending on the embodiments, for example, for a handover to a target cell.

In some embodiments, the UE may perform open-loop and/or close-loop power control. For example, the random access response received at step 645 may indicate a power control parameter and the UE may transmit the connection request at step 650 based on the power control parameter. Alternatively, the UE may fail to receive the random access response from the BS and may perform power ramping for subsequent random access attempts (e.g., increasing the transmit power for each subsequent random access attempt).

In some embodiments, when the method 600 is applied in a scheduling request procedure, the gNB may transmit a scheduling request configuration similar to the subband-based communication configuration at step 620. The UE may transmit a scheduling request signal similar to the random access preamble signal at step 640. The gNB may respond to the scheduling request signal by scheduling transmitting a scheduling request response including an UL grant. The scheduling request signal can include a predetermined sequence or coded information, such as a buffer status report, UE-specific CCA outcomes, a UE identify, and/or a power head room of the UE. The UE may transmit the scheduling request signal when the UE is synchronized to the BS and had received an assigned identifier (ID) from the BS. For example, the assigned ID may be a cell-radio network temporary identifier (C-RNTI) dynamically assigned by the BS during a successful random access procedure. The UE may transmit the scheduling request signal when the UE has uplink data ready for transmission, but no UL grant is received from the BS. The UE may transmit the scheduling request signal when the payload (e.g., the coded information) has a small size. For example, the UE may transmit a scheduling request signal including a preamble sequence. The UE may transmit the scheduling request signal without a UL grant when low-latency is required.

Figure 7:
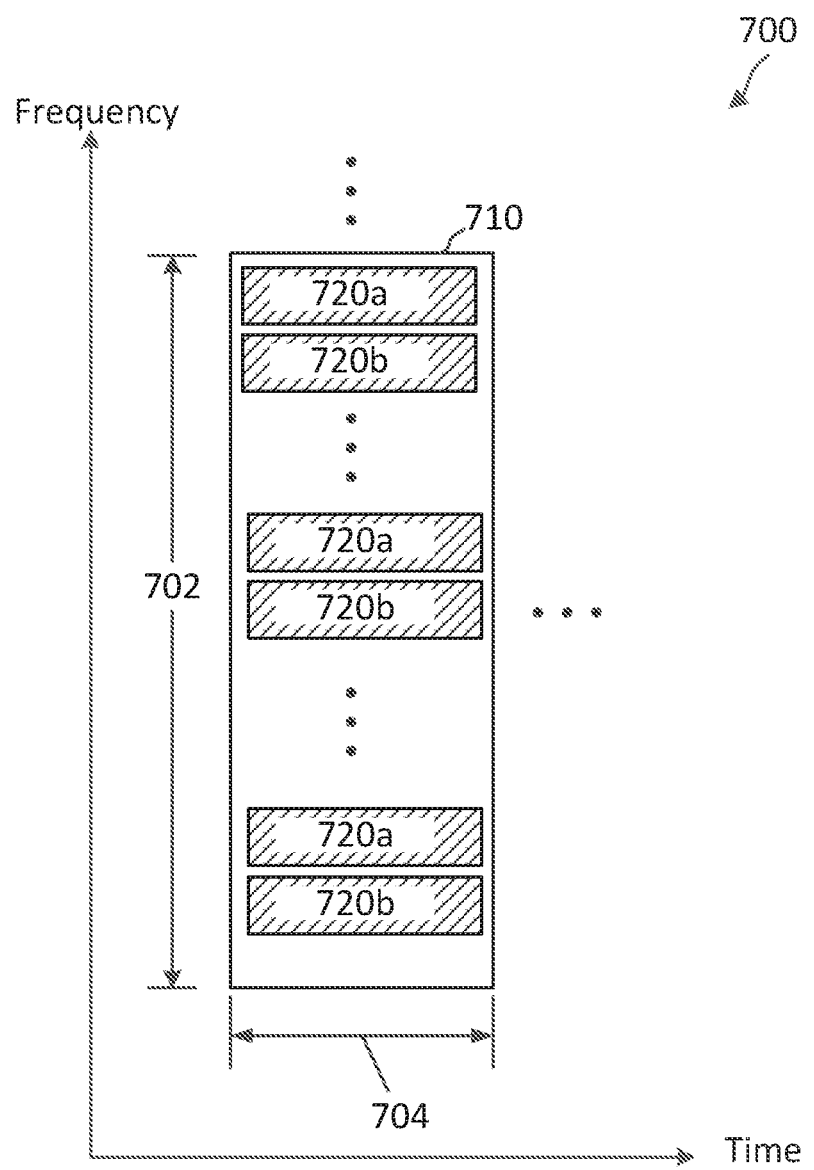
FIG. 7 illustrates a subband-based resource allocation scheme using frequency-division multiplexed (FDM) resources according to some embodiments of the present disclosure.

FIG. 7 illustrates a subband-based resource allocation scheme 700 that uses FDM resources according to some embodiments of the present disclosure. The scheme 700 may be employed by the networks 100 and 300 and the method 600. In FIG. 7, the x-axis represents time in some constant units and the y-axis represents frequency in some constant units. The scheme 700 allocates resources in units of subbands 702 (e.g., of about 20 MHz). As shown, the scheme 700 includes an allocation 710 in a subband 702 (e.g., the subband 310) for transmissions of random access requests or scheduling requests. FIG. 7 illustrates the allocation 710 in one subband 702 for simplicity of discussions, though it will be recognized that embodiments of the present disclosure may scale to include any suitable number of contiguous subbands 702 or non-contiguous subbands 702 in the allocation 710 based on CCAs performed at a BS (e.g., the BSs 105 and 500) and/or at a UE (e.g., the UEs 115 and 400). For example, the allocation 710 may span across two, three, four, five or more subbands 702.

The allocation 710 may span a time period 704, which may correspond to an UpPTS or a dedicated RACH slot in a channel occupancy time (COT). The COT may refer to a transmission period within a TXOP (e.g., the sub-intervals 220) reserved by the BS. The subband 702 may include a plurality of consecutive tones. The allocation 710 may include FDM resources 720 for use by multiple UEs (e.g., the UEs 115 and 400). Each FDM resource 720 may include a set of consecutive tones in the subband. A BS (e.g., the BSs 105 and 500) may transmit a configuration indicating the allocation 710, the subband 702, and the FDM resources 720.

For example, in the method 600, the gNB may transmit a configuration indicating the allocation 710, the subband 702, and the FDM resources 720. A UE may transmit a random access preamble signal across one or more of the FDM resources 720. For example, a UE A may transmit a random access preamble signal using the FDM resources 720a while a UE B may transmit a random access preamble signal using the FDM resources 720b at the same time.

Figure 8:
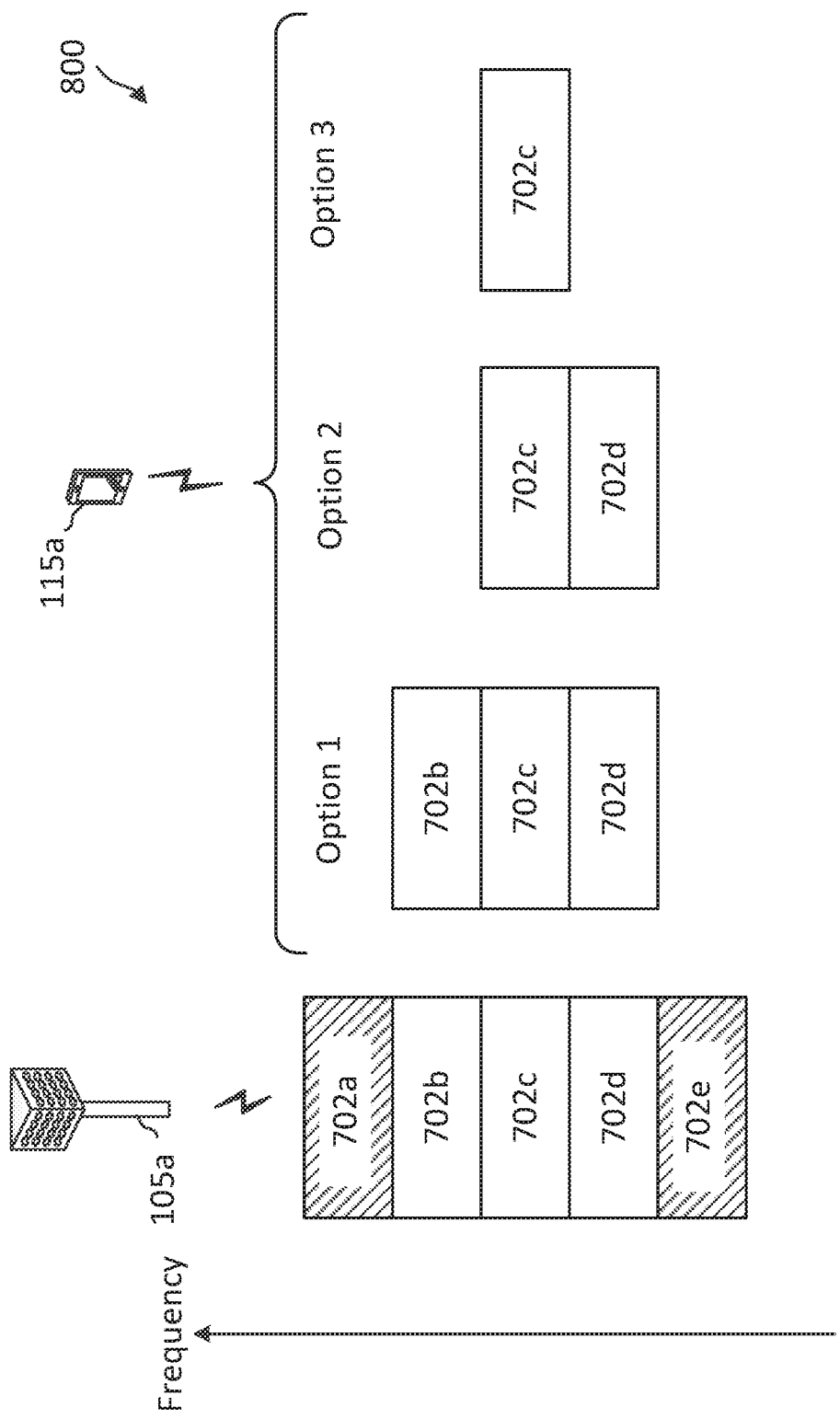
FIG. 8 illustrates a subband-based resource selection scheme according to some embodiments of the present disclosure.

FIG. 8 illustrates a subband-based resource selection scheme 800 according to some embodiments of the present disclosure. The scheme 800 may be employed by the networks 100 and 300 and the method 600. In FIG. 8, the y-axis represents frequency in some constant units. In the scheme 800, a BS 105a may perform CCAs on a number of subbands 702 (e.g., the subbands 310) and may select the subbands 702a, 702b, 702c, and/or 702d for transmissions of random access requests or scheduling requests. A UE 115a may perform a CCA in each of the subbands 702a, 702b, 702c, and 702d. The UE 115a may determine that that the CCAs failed (e.g., channel busy) in the subbands 702a and 702d, but the CCAs are successful in the subbands 702b, 702c, and 702d. Thus, the UE 115a may transmit in any of the subbands 702b, 702c, and 702d.

The UE 115a may select one or more of the subbands 702b, 702c, and 702d for transmissions. The selection may be based on a power parameter, a channel measurement, and/or an interference measurement as described above. For example, the UE 115a may transmit a random access preamble signal or a scheduling request signal in the subbands 702b, 702c, and 702d as shown in option 1. Alternatively, the UE 115a may transmit a random access preamble signal or a scheduling request signal in the subbands 702c and 702d as shown in option 2. Yet alternatively, the UE 115a may transmit a random access preamble signal or a scheduling request signal in the subband 702d as shown in option 3.

Figure 9:
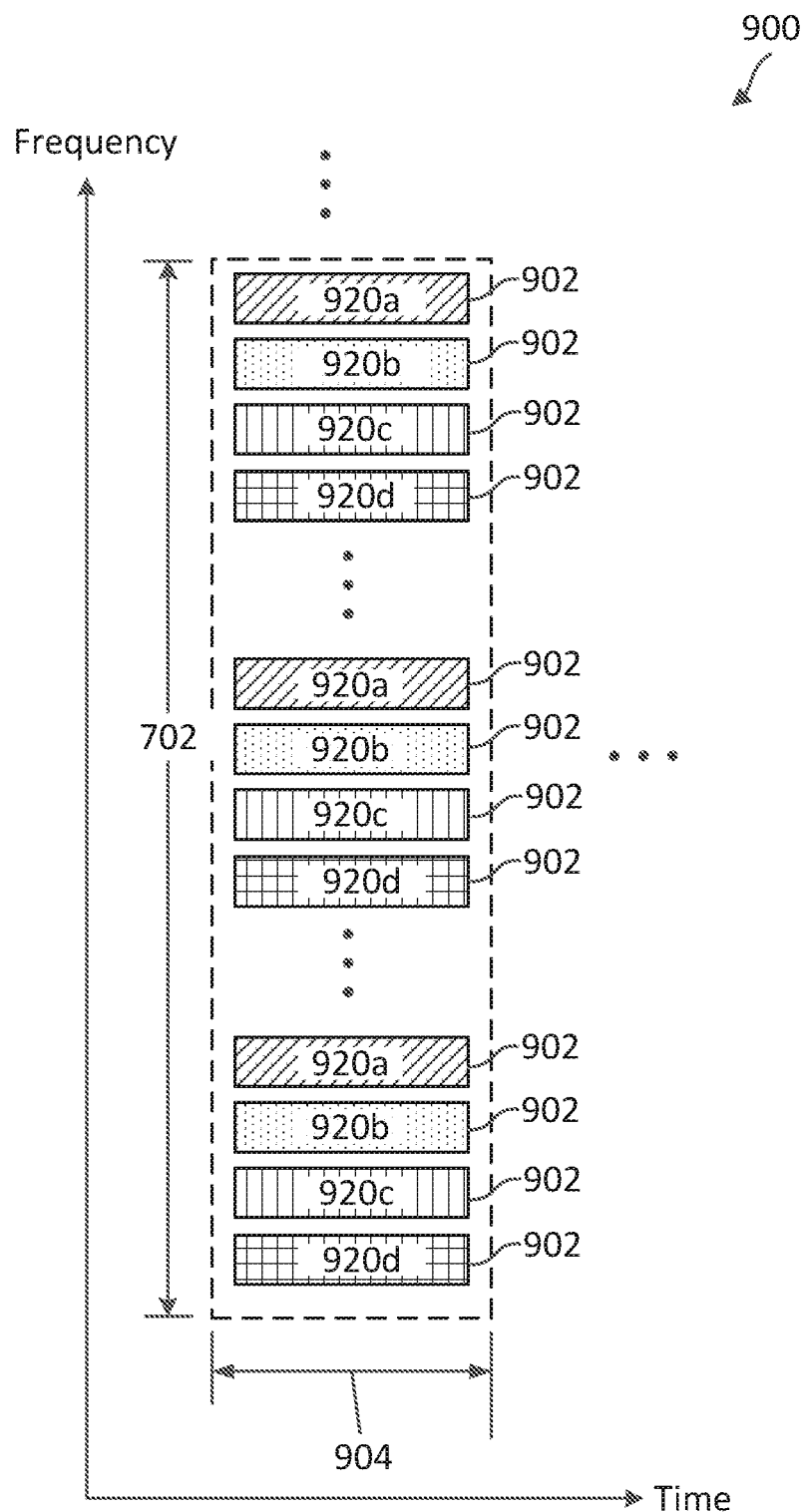
FIG. 9 illustrates a subband-based resource allocation scheme that uses frequency interlaces according to some embodiments of the present disclosure.
Figure 10:
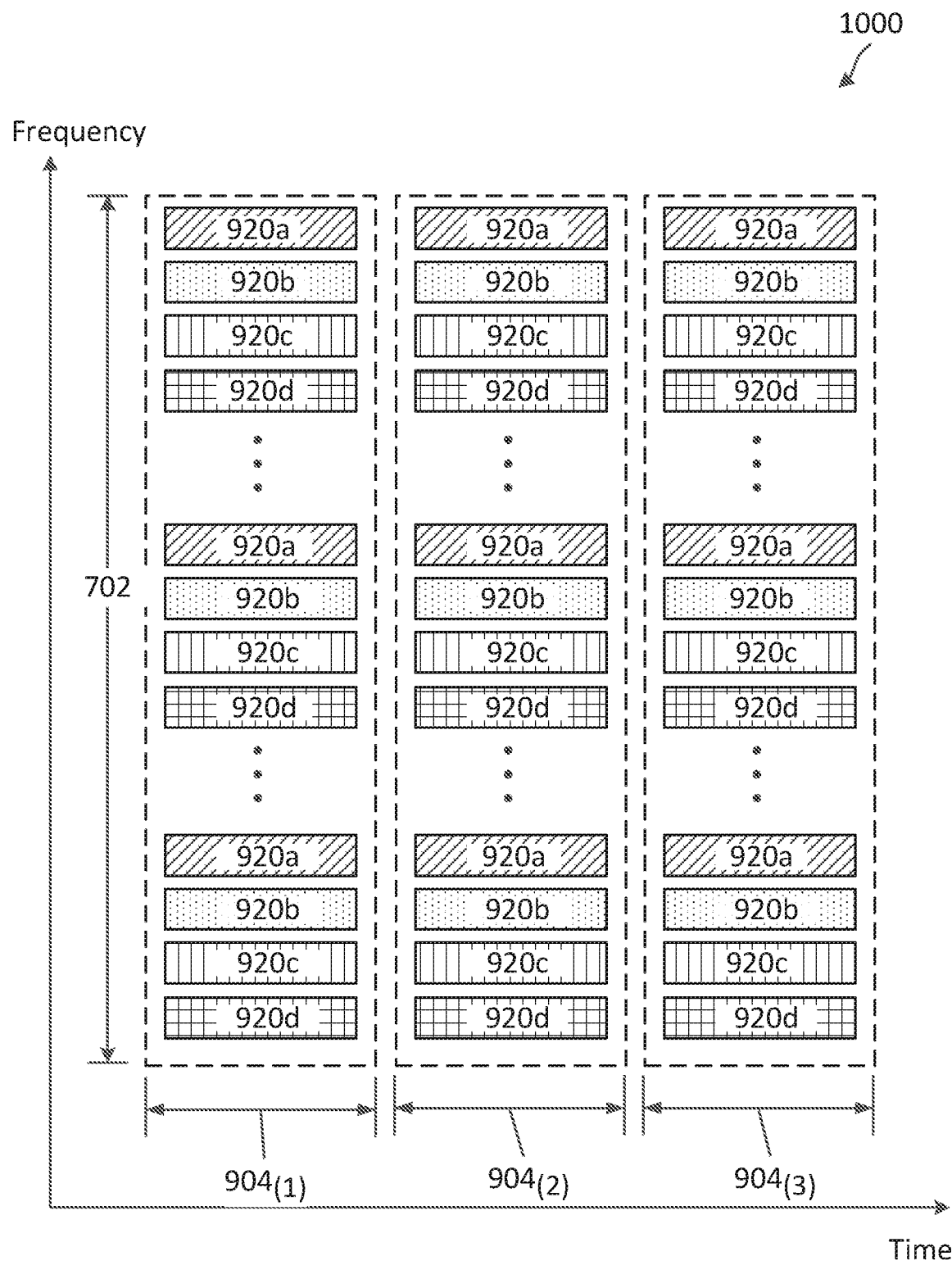
FIG. 10 illustrates a subband-based random access scheme that uses frequency interlaces according to some embodiments of the present disclosure.
Figure 11:
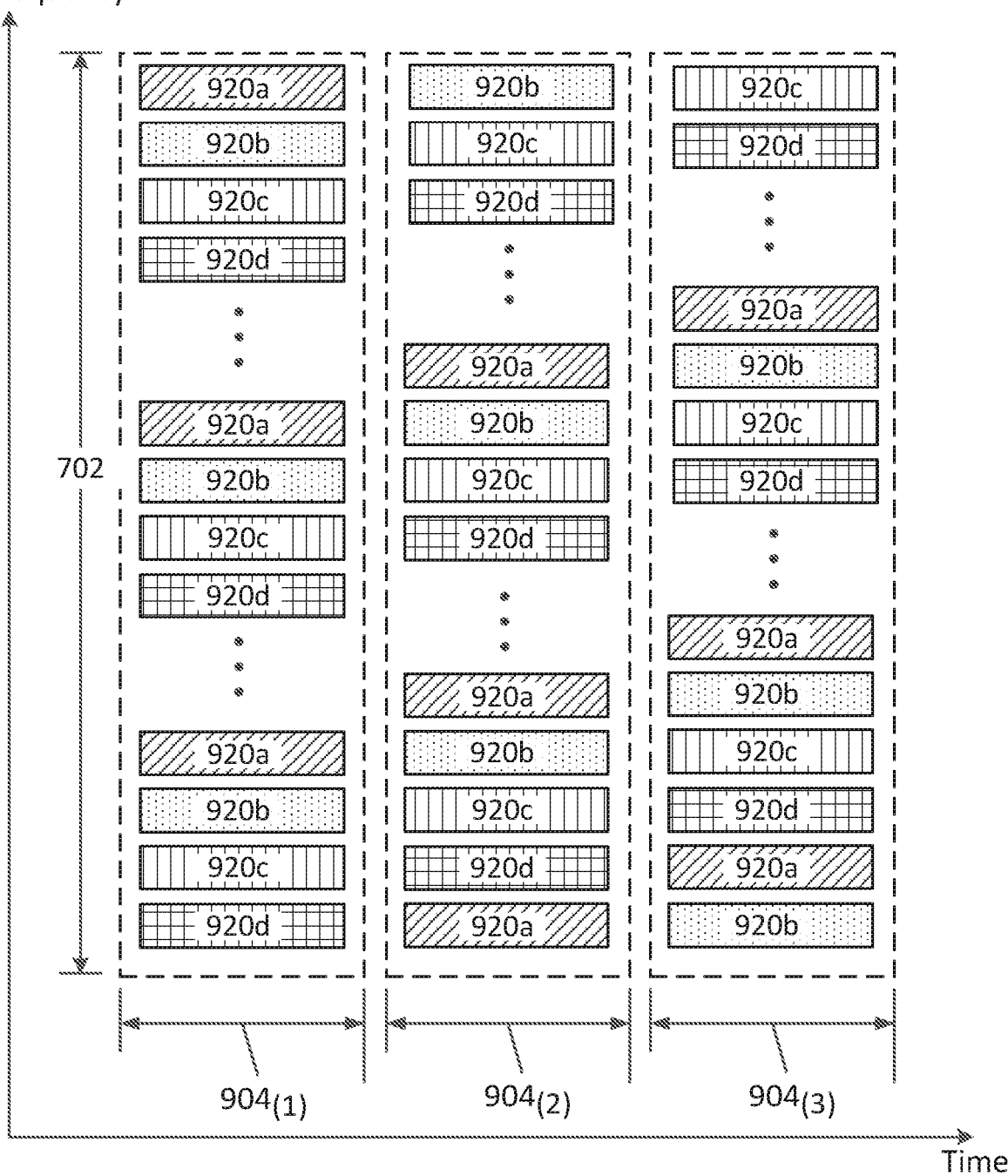
FIG. 11 illustrates a subband-based random access scheme that uses frequency interlaces according to some embodiments of the present disclosure.

FIGS. 9-11 illustrate various mechanisms for allocating subband-based resources with interlaces of frequency resources. In FIGS. 9-11, the x-axis represents time in some constant units and the y-axis represents frequency in some constant units.

FIG. 9 illustrates a subband-based resource allocation scheme 900 that uses frequency interlaces according to some embodiments of the present disclosure. The scheme 900 may be employed by the networks 100 and 300 and the method 600. The scheme 900 allocates resources in units of frequency interlaces 920 within subbands 702 over a time period 904. The time period 904 may include one or more OFDM symbols within an UpPTS or a dedicated RACH slot. FIG. 9 illustrates four frequency interlaces 920a, 920b, 920c, and 920d (e.g., shown as different pattern filled boxes) spanning one subband 702 for simplicity of discussions, though it will be recognized that embodiments of the present disclosure may scale to any suitable number of subbands 702 based on CCAs as described in the method 600. For example, the frequency interlaces 920 may span across two, three, four, five or more subbands 702.

The frequency interlaces 920 are orthogonal (e.g., non-overlapping in frequency). Each frequency interlace 920 includes interlaces of frequency resources 902 in the subband 702. In some instances, each frequency resource 902 spans one frequency tone or subcarrier. In some other instances, each frequency resource 902 spans two or more consecutive frequency tones or subcarriers. The frequency interlaces 920 are spaced apart from each other, for example, by one or more tones or one or more frequency interlaces 920. In some embodiments, a frequency interlace 920 may include frequency resources 902 uniformly spaced within a subband 702. In some embodiments, different subbands 702 may include different frequency interlaced structures. Each frequency interlace 920 may correspond to a PRACH opportunity or a scheduling request opportunity.

As an example, a UE A may transmit a random access preamble signal or a scheduling request signal in the frequency interlace 920a. A UE B may transmit a random access preamble signal or a scheduling request signal in the frequency interlace 920b. A UE C may transmit a random access preamble signal or a scheduling request signal in the frequency interlace 920c. A UE D may transmit a random access preamble signal or a scheduling request signal in the frequency interlace 920d. The use of frequency interlaces 920 can reduce the PAPR of a random access preamble signal or a scheduling request signal.

FIG. 10 illustrates a subband-based resource allocation scheme 1000 that uses frequency interlaces according to some embodiments of the present disclosure. The scheme 1000 may be employed by the networks 100 and 300 and the method 600. The scheme 1000 is substantially similar to the scheme 900. For example, the scheme 1000 allocates resources in units of frequency interlaces 920 within subbands 702. However, the scheme 1000 provides time bundling over a number of time periods 904. FIG. 10 illustrates time bundling over three consecutive time periods 904 for simplicity of discussions, though it will be recognized that embodiments of the present disclosure may scale to provide time bundling over any suitable number of time periods 904 (e.g., about two, four, or five).

As shown, the scheme 1000 includes frequency interlaces 920 repeated over multiple time periods 904. A frequency interlace 920 may occupy the same set of tones across the time periods 904. As an example, a UE A (e.g., the UEs 115) may repeatedly transmit a random access preamble signal or a scheduling request signal using the frequency interlace 920a over the time periods 904. The UE A may transmit the same random access preamble signal or the scheduling request signal in each of the time period 904. Similarly, a UE B may repeatedly transmit a random access preamble signal or a scheduling request signal using the frequency interlace 920b over the time periods 904. A UE C may repeatedly transmit a random access preamble signal or a scheduling request signal using the frequency interlace 920c over the time periods 904. A UE D may repeatedly transmit a random access preamble signal or a scheduling request signal using the frequency interlace 920d over the time periods 904. The use of time bundling may improve transmission performance of random access preamble signals and/or scheduling request signals. For example, certain tones may experience interference in one time period 904, but not in another time period 904. Thus, the time bundling provides a UE with multiple chances of transmitting a preamble random access signal over the same set of tones, which may be cleared from interference in at least one of the time period 904.

FIG. 11 illustrates a subband-based resource allocation scheme 1100 that uses frequency interlaces according to some embodiments of the present disclosure. The scheme 1100 may be employed by the networks 100 and 300 and the method 600. The scheme 1100 is substantially similar to the scheme 1000. For example, the scheme 1100 provides time bundling of frequency interlaces 920 over a number of time periods 904. However, the scheme 1100 may apply permutation to the tone allocations (e.g., frequency hopping). FIG. 11 illustrates a frequency hopping pattern where each frequency interlace 920 is frequency-shifted from one time period 904 to another time period 904. The use of frequency hopping may improve transmission performance of random access preamble signals and/or scheduling request signals. For example, certain tones may experience deep fading, and thus the frequency hopping allow a UE to transmit a preamble random access signal in each time period 904 using a different set of tones.

Figure 12:
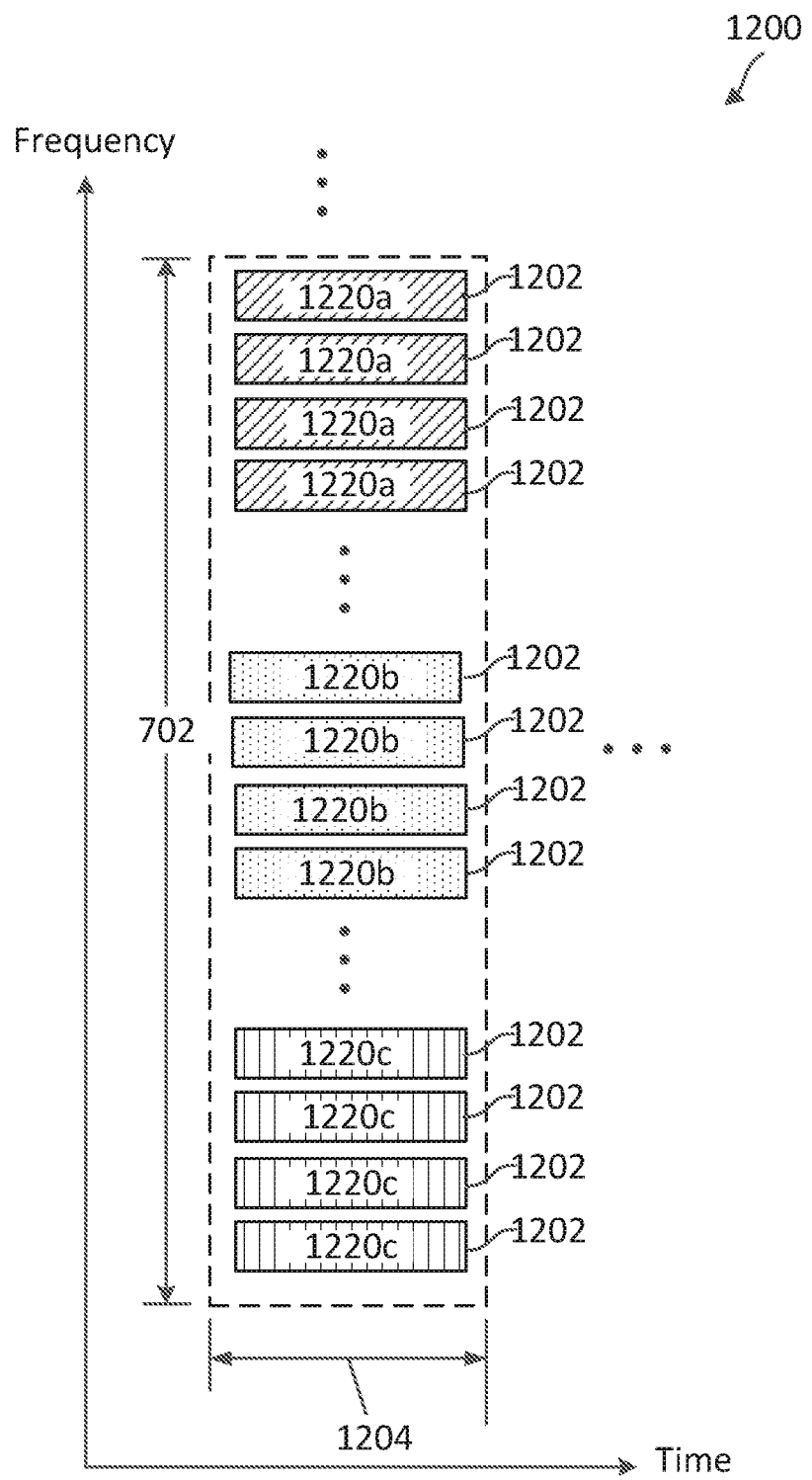
FIG. 12 illustrates a subband-based resource allocation scheme that uses frequency tone groups according to some embodiments of the present disclosure.
Figure 13:
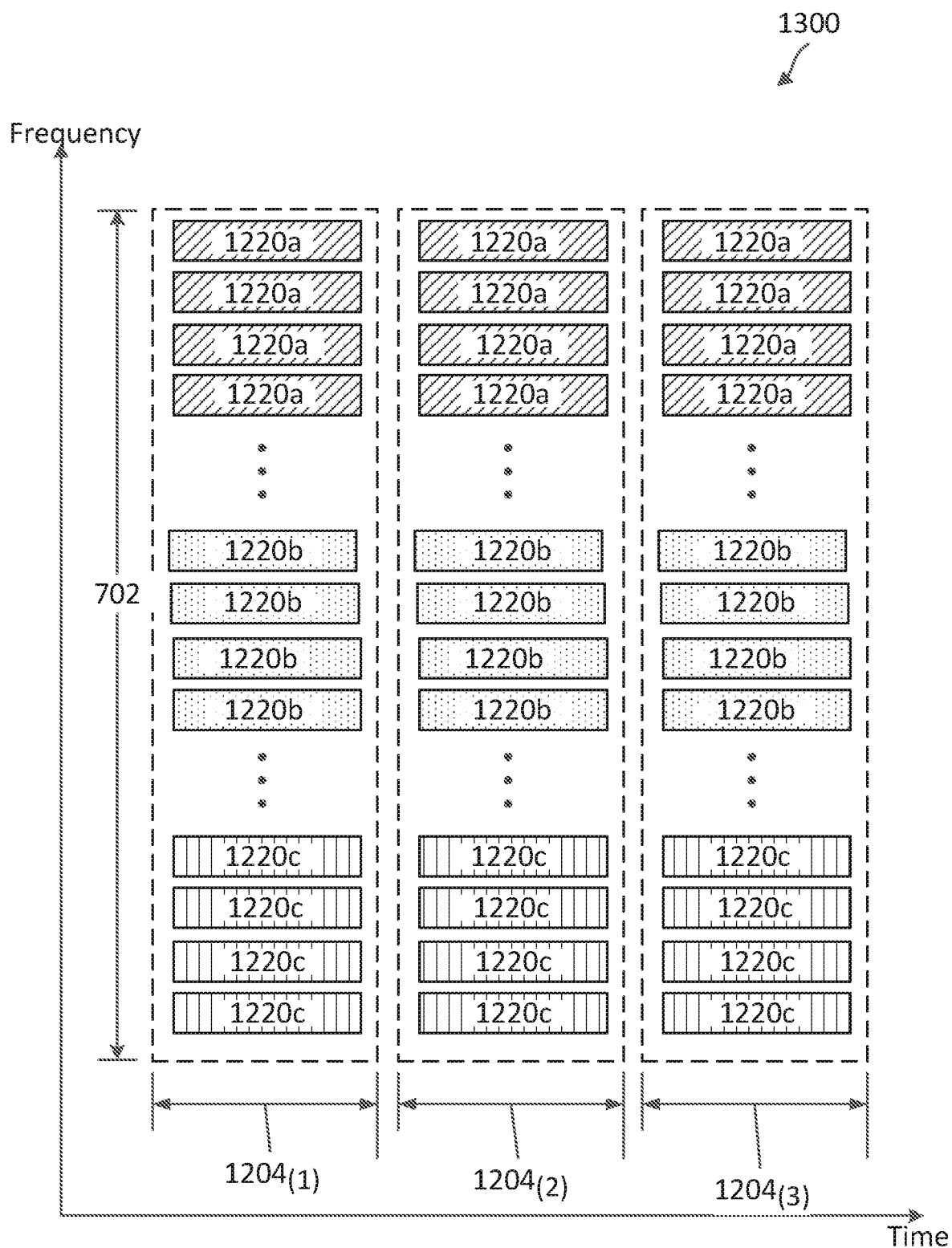
FIG. 13 illustrates a subband-based resource allocation scheme that uses frequency tone groups according to some embodiments of the present disclosure.
Figure 14:
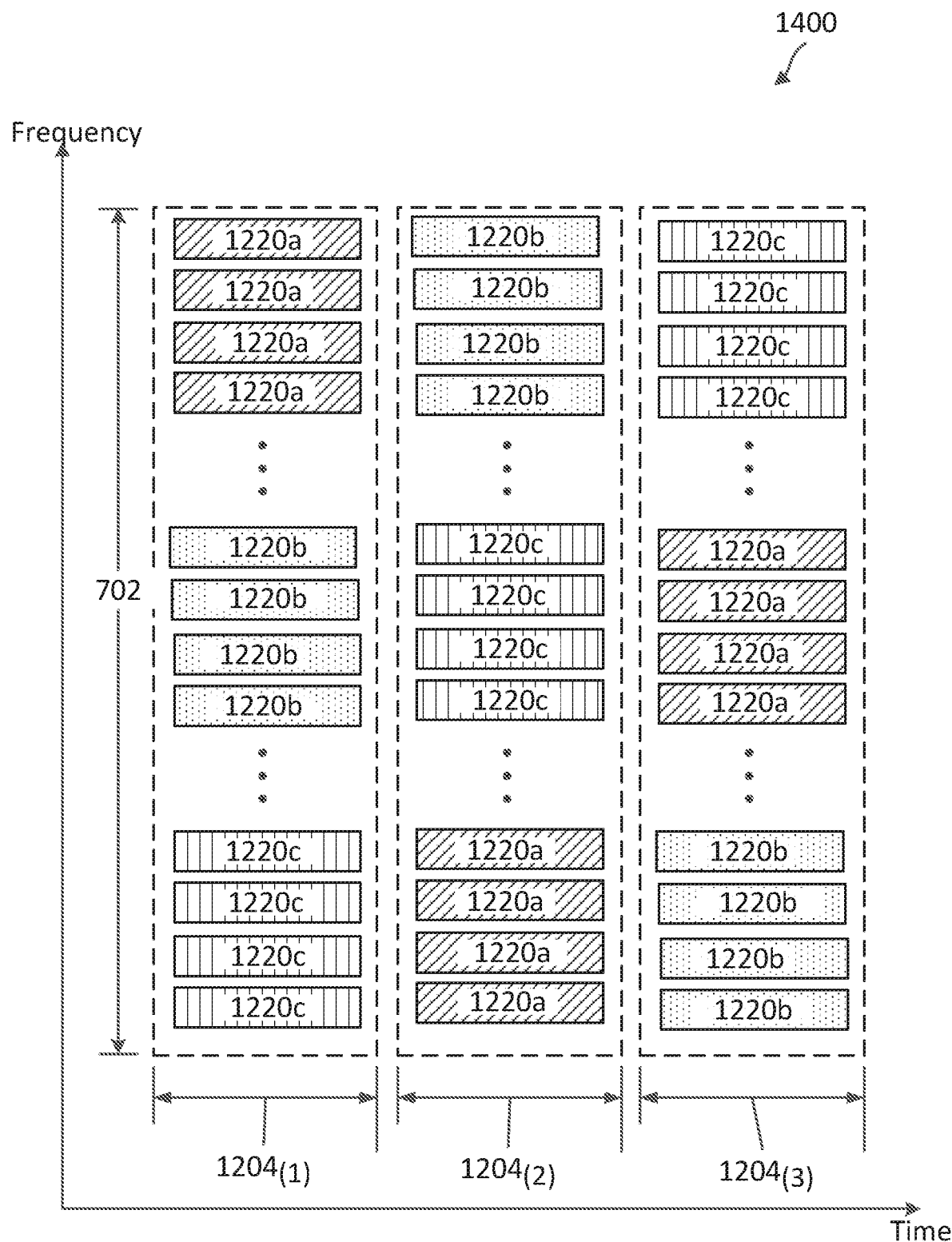
FIG. 14 illustrates a subband-based resource allocation scheme that uses frequency tone groups according to some embodiments of the present disclosure.

FIGS. 12-14 illustrate various mechanisms for allocating subband-based resources with grouping of frequency tones. In FIGS. 12-14, the x-axis represents time in some constant units and the y-axis represents frequency in some constant units.

FIG. 12 illustrates a subband-based resource allocation scheme 1200 that uses frequency tone groups according to some embodiments of the present disclosure. The scheme 1200 may be employed by the networks 100 and 300 and the method 600. The scheme 1200 allocates resources in units of frequency tone groups 1220 within subbands 702 over a time period 1204 (e.g., the time period 904). FIG. 12 illustrates four frequency tone groups 1220a, 1220b, 1220c, and 1220d (e.g., shown as different pattern filled boxes) spanning one subband 702 for simplicity of discussions, though it will be recognized that embodiments of the present disclosure may scale to any suitable number of subbands 702 based on CCAs as described in the method 600. For example, the frequency tone groups 1220 may span across two, three, four, five or more subbands 702.

The frequency tone groups 1220 are orthogonal (e.g., non-overlapping in frequency). Each frequency tone groups 1220 includes consecutive tones 1202 in the subband 702. In some embodiments, different subbands 702 may include different grouping of tones 1202. Each frequency tone groups 1220 may correspond to a PRACH opportunity or a scheduling request opportunity.

As an example, a UE A may transmit a random access preamble signal or a scheduling request signal in the frequency tone groups 1220a. A UE B may transmit a random access preamble signal or a scheduling request signal in the frequency tone groups 1220b. A UE C may transmit a random access preamble signal or a scheduling request signal in the frequency tone groups 1220c. A UE D may transmit a random access preamble signal or a scheduling request signal in the frequency tone groups 1220d.

FIG. 13 illustrates a subband-based resource allocation scheme 1300 that uses frequency interlaces according to some embodiments of the present disclosure. The scheme 1300 may be employed by the networks 100 and 300 and the method 600. The scheme 1300 is substantially similar to the scheme 1200. For example, the scheme 1300 allocates resources in units of frequency tone groups 1220 within subbands 702. However, the scheme 1300 provides time bundling over a number of time periods 1204. FIG. 13 illustrates time bundling over three consecutive time periods 1204 for simplicity of discussions, though it will be recognized that embodiments of the present disclosure may scale to provide time bundling over any suitable number of time periods 1204 (e.g., about two, four, or five).

As shown, the scheme 1300 includes frequency tone groups 1220 repeated over multiple time periods 1204. A frequency tone group 1220 may occupy the same set of tones across the time periods 904. As an example, a UE A (e.g., the UEs 115) may repeatedly transmit a random access preamble signal or a scheduling request signal using the frequency tone groups 1220a over the time periods 1204. The UE A may transmit the same random access preamble signal or the scheduling request signal in each of the time period 1204. Similarly, a UE B may repeatedly transmit a random access preamble signal or a scheduling request signal using the frequency tone groups 1220b over the time periods 904. A UE C may repeatedly transmit a random access preamble signal or a scheduling request signal using the frequency tone groups 1220c over the time periods 1204. A UE D may repeatedly transmit a random access preamble signal or a scheduling request signal using the frequency tone groups 1220d over the time periods 1204. Similar to the scheme 1000, the use of time bundling with repetitions may improve transmission performance of random access preamble signals and/or scheduling request signals.

FIG. 14 illustrates a subband-based resource allocation scheme 1400 that uses frequency tone groups according to some embodiments of the present disclosure. The scheme 1400 may be employed by the networks 100 and 300 and the method 600. The scheme 1400 is substantially similar to the scheme 1300. For example, the scheme 1400 provides time bundling of frequency tone groups 1220 over a number of time periods 1204. However, the scheme 1400 may apply permutation to the tone allocations (e.g., frequency hopping). FIG. 14 illustrates a frequency hopping pattern where each frequency tone groups 1220 is frequency-shifted from one time period 1204 to another time period 1204. Similar to the scheme 1100, the use of frequency hopping may improve transmission performance of random access preamble signals and/or scheduling request signals, for example, under deep fading.

Figure 15:
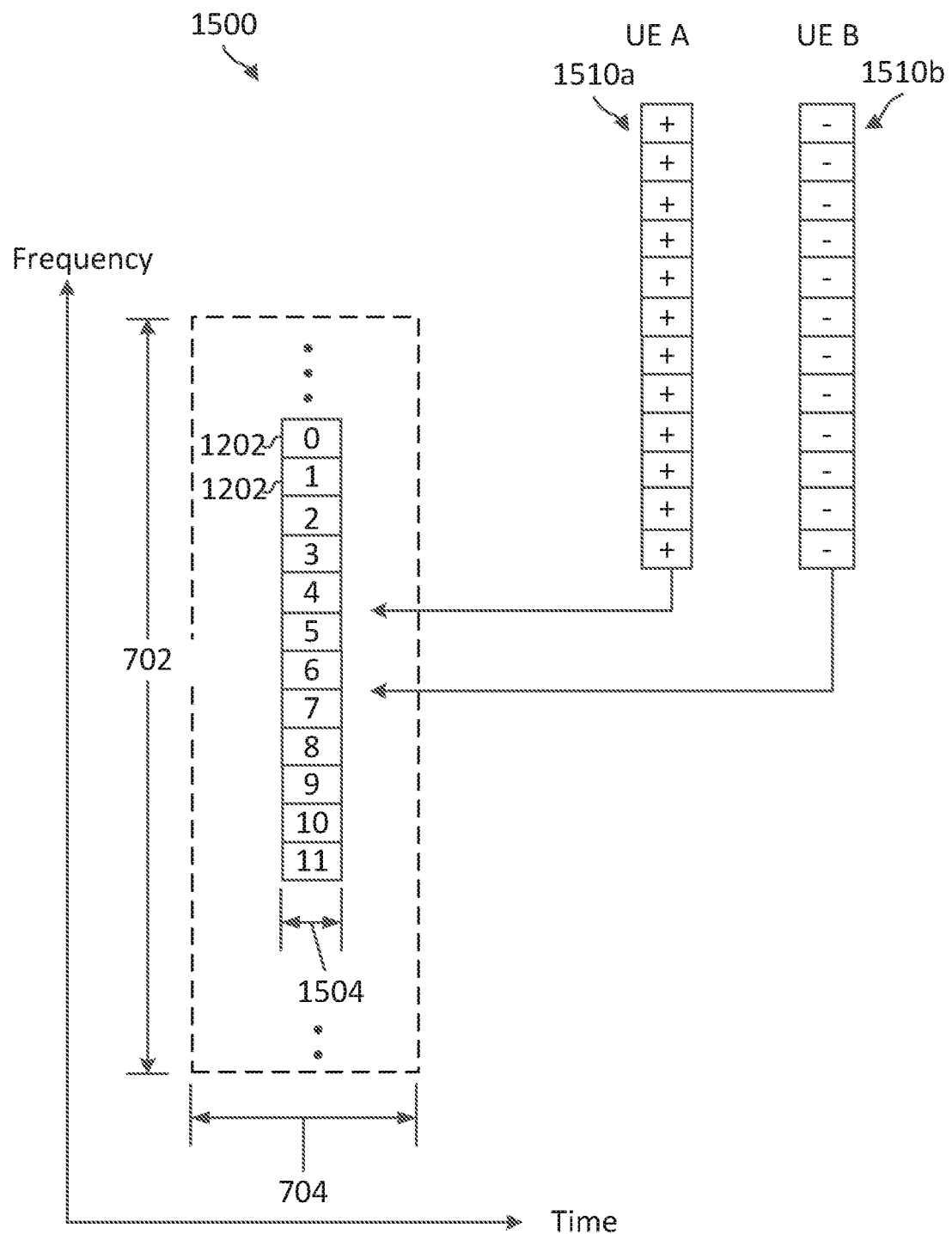
FIG. 15 illustrates a subband-based communication scheme that applies orthogonal code codes (OCCs) in a frequency domain according to some embodiments of the present disclosure.
Figure 16:
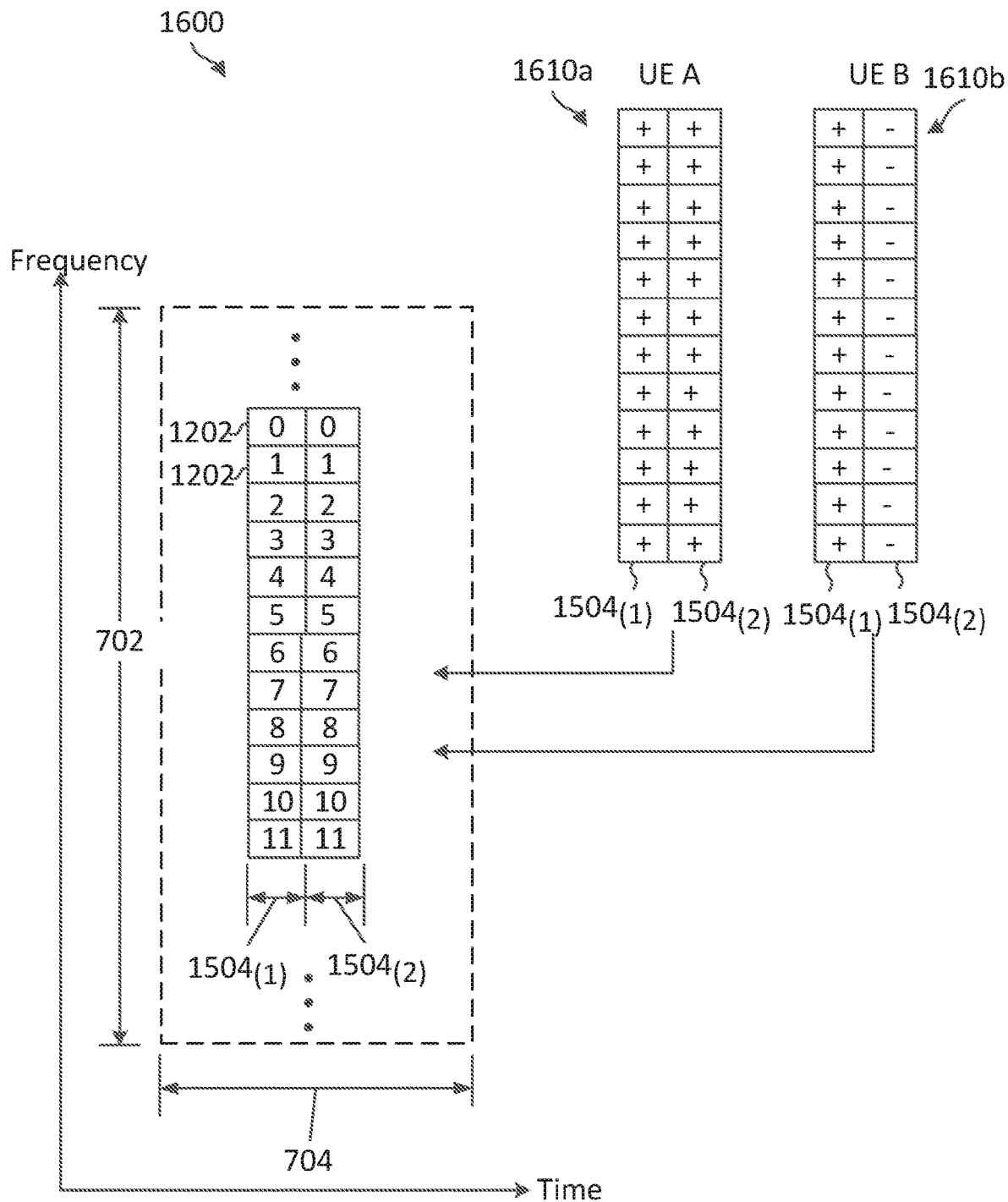
FIG. 16 illustrates a subband-based communication scheme that applies OCCs in a time domain according to some embodiments of the present disclosure.

FIGS. 15 and 16 illustrate various mechanisms for improving random access or scheduling capacity in a frequency spectrum by allowing multiple UEs to transmit on the same resources, but with different OCCs. In FIGS. 15-16, the x-axis represents time in some constant units and the y-axis represents frequency in some constant units.

FIG. 15 illustrates a subband-based communication scheme 1500 that applies OCCs in a frequency domain according to some embodiments of the present disclosure. The scheme 1500 may be employed by the networks 100 and 300 and the method 600. FIG. 15 illustrates twelve tones 1202 in one subband 702 for simplicity of discussions, though it will be recognized that embodiments of the present disclosure may scale to any suitable number of subbands 702 based on CCAs and any suitable number of tones 1202. For example, the scheme 1500 may be applied to 2, 3, 4, 5 or more subbands 702 and each subband 702 may include about 2, 4, 6, 12, 24 or more tones 1202.

In the scheme 1500, a UE A (e.g., the UEs 115 and 400) and a UE B (e.g., the UEs 115 and 400) may transmit a random access preamble signal or a scheduling request signal on the same set of tones 1202 during the same time period 704. However, a BS (e.g., the BSs 105 and 500) may assign the UE A with an OCC 1510a and may assign the UE B with an OCC 1510b. The OCC 1510a and the OCC 1510b may be orthogonal. For example, the OCCs 1510a and 1510b may be Walsh codes, discrete Fourier transform (DFT) sequences, pseudo-noise (PN) sequences, or computed generated sequences (CGSs). The UE A may apply the OCC 1510a in a frequency domain when transmitting a random access preamble signal or a scheduling request signal on the tones 1202. The UE B may apply the OCC 1510a in a frequency domain when transmitting a random access preamble signal or a scheduling request signal on the tones 1202. The OCCs 1510a and 1510b enable the BS to differentiate the identity of a corresponding transmitting device (e.g., the UE A versus the UE B) upon a detection of a transmission in the tones 1202.

FIG. 16 illustrates a subband-based communication scheme 1600 that applies OCCs in a time domain according to some embodiments of the present disclosure. The scheme 1600 may be employed by the networks 100 and 300 and the method 600. FIG. 16 illustrates twelve tones 1202 in one subband 702 over two symbols 1504 for simplicity of discussions, though it will be recognized that embodiments of the present disclosure may scale to any suitable number of subbands 702 based on CCAs over any suitable number of symbols 1504 and any suitable number of tones 1202. For example, the scheme 1500 may be applied to 2, 3, 4, 5 or more subbands 702 over 3, 4 or more symbols 1504 and each subband 702 may include about 2, 4, 6, 12, 24 or more tones 1202.

In the scheme 1600, a UE A (e.g., the UEs 115 and 400) and a UE B (e.g., the UEs 115 and 400) may transmit a random access preamble signal or a scheduling request signal on the same set of tones 1202 during the same two symbols 1504. However, a BS (e.g., the BSs 105 and 500) may assign the UE A with an OCC 1610a and may assign the UE B with an OCC 1610b. The OCC 1610a and the OCC 1610b may be orthogonal to each other. For example, the OCCs 1610a and 1610b may be Walsh codes, DFT sequences, PN sequences, or CGSs. The UE A may apply the OCC 1610a in a time domain when transmitting a random access preamble signal or a scheduling request signal on the tones 1202. The UE B may apply the OCC 1610a in a time domain when transmitting a random access preamble signal or a scheduling request signal on the tones 1202. The OCCs 1610a and 1610b enable the BS to differentiate the identity of a corresponding transmitting device (e.g., the UE A versus the UE B) upon a detection of a transmission in the tones 1202.

In an embodiment, a BS (e.g., the BSs 105 and 500) may configure resources using any suitable combination of the schemes 700, 900, 1000, 1100, 1200, 1300, 1400, 1500, and 1600 described above with respect to FIGS. 7, 9, 10, 11, 12, 13, 14, 15, and 16, respectively. For example, the schemes 1500 or 1600 may be combined with the schemes 900, 1000, and 111 to enable multiple UEs (e.g., the UEs 115 and 400) to transmit on the same frequency interlace (e.g., the frequency interlace 920a) using OCCs. Alternatively, the schemes 1500 or 1600 may be combined with the schemes 1200, 1300, and 1400 to enable multiple UEs (e.g., the UEs 115 and 400) to transmit on the same frequency tone group (e.g., the frequency tone group 1220a) using OCCs.

In some embodiments, the BS may additionally assign different transmit power scaling factors for different time periods 704, 904, and 1204. For example, the BS may assign a transmit power scaling factor of about 1 decibel (dB) for one time period $904_{(1)}$ and a transmit power scaling factor of about 3 dB for another time period $904_{(2)}$.

In some embodiments, the BS may additionally assign different transmit power scaling factor for different UEs (e.g., the UEs 115 and 400). For example, the BS may assign a transmit power scaling factor of about 1 dB for one UE (e.g., the UE 115a) and a transmit power scaling factor of about 3 dB for another UE (e.g., the UE 115b). In some instances, the BS use a round-robin mechanism to assign the transmit power scaling factors to the UEs to improve interference randomization and/or fairness. In such embodiments, the BS may perform multi-user detection for detecting a random access preamble signal or a scheduling request signal by applying successive interference cancellation.

In some embodiments, the BS may additionally instruct a UE (e.g., the UEs 115 and 400) to employ a different RACH transmit power ramping procedures when switching from a single subband (e.g., the subbands 702) to multiple subbands or switching from multiple subbands to a single subband. The different RACH transmit power ramping procedures may include different power step size and/or different time window size for power control for each successive random access attempt. For example, after an unsuccessful random access attempt, a UE may wait for a duration of the window size and retry a next random access attempt. At the next random access attempt, the UE may select another preamble sequence and transmit the newly selected preamble sequence with a transmit power increased by the step size.

In some embodiments, the BS may additionally instruct a UE (e.g., the UEs 115 and 400) to employ a different RACH transmit power ramping procedures when the UE transmits a random access preamble signal within a maximum channel occupancy time (MCOT) (e.g., a reserved transmission period within a TXOP reserved by the BS) and outside a MCOT. For example, the UE may use one RACH transmit power ramping procedure when transmitting within a MCOT reserved by the BS and another RACH transmit power ramping procedure when transmitting outside the MCOT. The different RACH transmit power ramping procedures may include different power step size and/or different time window size for power control. Further, the BS may employ different signaling to indicate the different RACH transmit power ramping procedures, for example, via different downlink control information (DCI) format in a PDCCH.

In some embodiments, when the BS configures resources in multiple subbands (e.g., the subbands 702) for transmissions of random access or scheduling requests, the BS may monitor for a random access preamble signal or a scheduling request signal in the configured subbands. Upon detecting a random access preamble signal or a scheduling request signal, the BS may apply joint processing on the signals received from the different subbands to determine an identity of the transmitter (e.g., the UEs 115 and 400).

In some embodiments, the BS configure resources in multiple time periods (e.g., the time periods 904 and 1204) for transmissions of random access or scheduling requests as shown in the schemes 1000, 1100, 1300, and 1400, the BS may monitor for a random access preamble signal or a scheduling request signal in the configured subbands during the time periods. Upon detecting a random access preamble signal or a scheduling request signal, the BS may apply joint processing on the signals received from the different time periods to determine an identity of the transmitter (e.g., the UEs 115 and 400).

Figure 17:
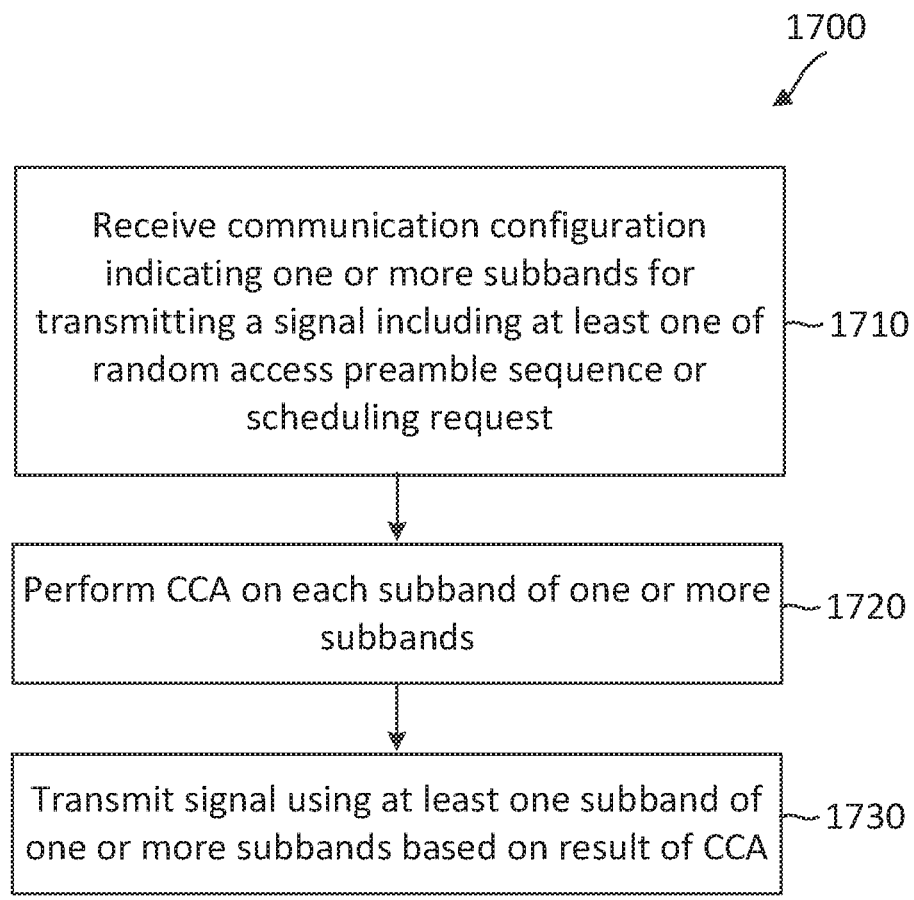
FIG. 17 is a flow diagram of a subband-based communication method according to embodiments of the present disclosure.

FIG. 17 is a flow diagram of a subband-based communication method 1700 according to embodiments of the present disclosure. Steps of the method 1700 can be executed by a computing device (e.g., a processor, processing circuit, and/or other suitable component) of a wireless communication device or other suitable means for performing the steps. For example, a wireless communication device, such as the UEs 115 and 400 may utilize one or more components, such as the processor 402, the memory 404, the subband-based communication module 408, the transceiver 410, the modem 412, and the one or more antennas 416, to execute the steps of method 1700. The method 1700 may employ similar mechanisms as in the schemes 200, 700, 800, 900, 1000, 1100, 1200, 1300, 1400, and 1500 and the method 600 described with respect to FIGS. 2, 7, 8, 9, 10, 11, 12, 13, 14, 15, and 6, respectively. As illustrated, the method 1700 includes a number of enumerated steps, but embodiments of the method 1700 may include additional steps before, after, and in between the enumerated steps. In some embodiments, one or more of the enumerated steps may be omitted or performed in a different order.

At step 1710, the method 1700 includes receiving a communication configuration indicating one or more subbands (e.g., the subbands 702) for transmitting a signal including at least one of a random access preamble sequence or a scheduling request. The communication configuration may be received from a BS (e.g., the BSs 105 and 500). The communication configuration may be received from a DRS.

At step 1720, the method 1700 includes performing a CCA on each subband of the one or more subband. The CCA may be based on energy detection or detection of specific reservation signal.

At step 1730, the method 1700 includes transmitting the signal using at least one subband of the one or more subbands based on a result of the CCA.

In an embodiment, the method 1700 can determine a subset of the one or more subbands for which the CCA is successful and select the at least one subband from the subset of the one or more subbands. The selection can include be based on at least one of an interference measurement, a channel measurement, or a power parameter of the wireless communication device.

In an embodiment, the one or more subbands include FDM resources (e.g., the resources 720) for random access a plurality of UEs including the first wireless communication device. In an embodiment, the one or more subbands include FDM resources (e.g., the resources 720) for a plurality of wireless communication devices including the first wireless communication device to request for a scheduling grant.

In an embodiment, the signal can be transmitted by transmitting a portion of the signal using a first subband of the one or more subbands for which the CCA is successful and another portion of the signal using a second subband of the one or more subbands for which the CCA is successful. The first subband and the second subband are non-contiguous in frequency.

In an embodiment, the communication configuration further indicates a plurality of interlaces (e.g., the interlaces 920) of frequency resources (e.g., the frequency resources 902) in the one or more subbands. In such an embodiment, the signal can be transmitted by transmitting the signal using a first interlace of the plurality of interlaces (e.g., as shown in the schemes 900, 1000, and 1100). The first interlace includes frequency resources in the at least one subband.

In an embodiment, the communication configuration further indicates a plurality of time periods (e.g., the time periods 904 and 1204) and a power scaling configuration. In such an embodiment, the signal can be transmitted by transmitting the signal during a first time period of the plurality of time periods based on a first power scaling factor in the power scaling configuration and transmitting the signal during a second time period of the plurality of time periods based on a second power scaling factor in the power scaling configuration. The first time period and the second time period are different. The first power scaling factor and the second power scaling factor are different.

In an embodiment, the communication configuration further indicates a plurality of time periods. In such an embodiment, the signal can be transmitted by transmitting the signal using the at least one subband during a first time period of the plurality of time periods and transmitting the signal using the at least one subband during a second time period of the plurality of time periods (e.g., as shown in the schemes 1000 and 1300). The first time period and the second time period are different.

In an embodiment, the communication configuration further indicates a plurality of time periods and a frequency hopping pattern. In such an embodiment, the signal is transmitted by transmitting the signal using the at least one subband based on the frequency hopping pattern during a first time period of the plurality of time periods and transmitting the signal using another subband based on the frequency hopping pattern during a second time period of the plurality of time periods (e.g., as shown in the schemes 1100 and 1400). The first time period and the second time period are different.

In an embodiment, the signal can be transmitted by applying an OCC (e.g., the OCCs 1510 and 1610) in at least one of a time domain (e.g., as shown in the scheme 1600) or a frequency domain (e.g., as shown in the scheme 1500).

Figure 18:
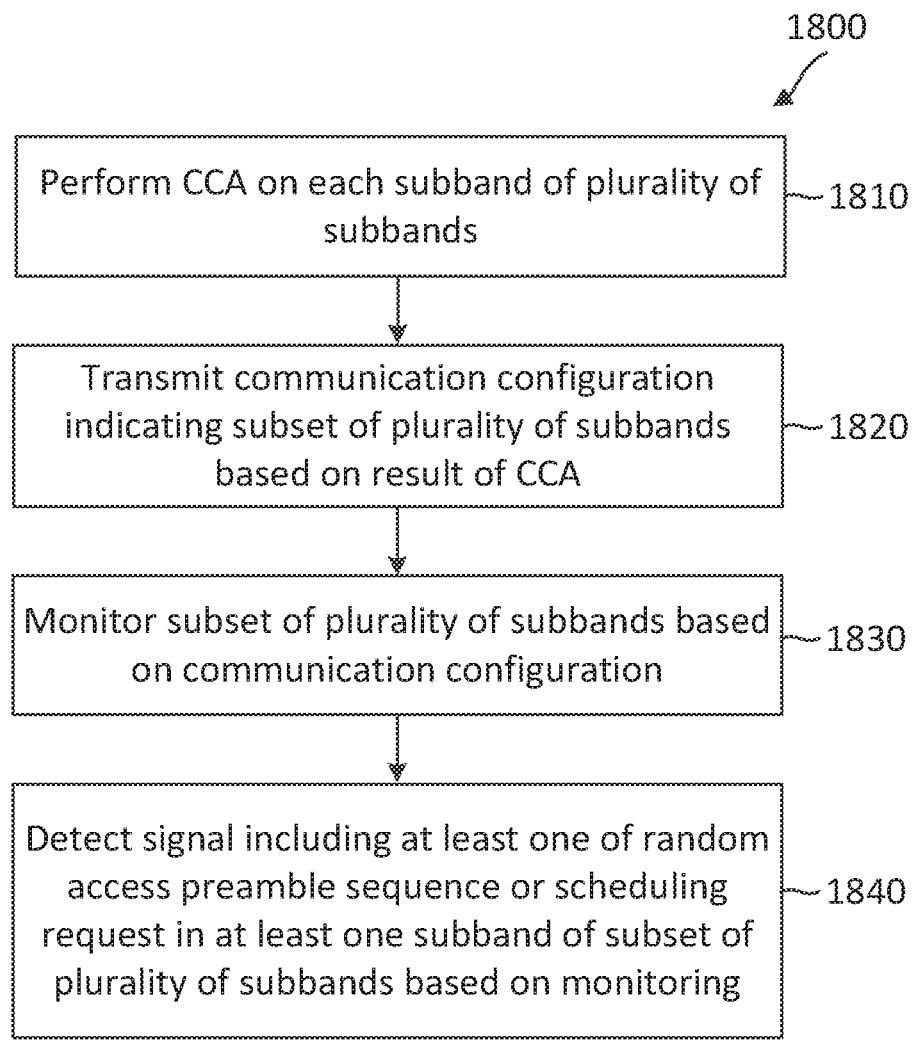
FIG. 18 is a flow diagram of a subband-based communication method according to embodiments of the present disclosure.

FIG. 18 is a flow diagram of a subband-based communication method 1800 according to embodiments of the present disclosure. Steps of the method 1800 can be executed by a computing device (e.g., a processor, processing circuit, and/or other suitable component) of a wireless communication device or other suitable means for performing the steps. For example, a wireless communication device, such as the BSs 105 and 500, may utilize one or more components, such as the processor 502, the memory 504, the subband-based communication module 508, the transceiver 510, the modem 512, and the one or more antennas 516, to execute the steps of method 1800. The method 1800 may employ similar mechanisms as in the schemes 200, 600, 700, 800, 900, 1000, 1100, 1200, 1300, 1400, and 1500 described with respect to FIGS. 2, 6, 7, 8, 9, 10, 11, 12, 13, 14, and 15, respectively. As illustrated, the method 1800 includes a number of enumerated steps, but embodiments of the method 1800 may include additional steps before, after, and in between the enumerated steps. In some embodiments, one or more of the enumerated steps may be omitted or performed in a different order.

At step 1810, the method includes performing a clear channel assessment (CCA) on each subband of a plurality of subbands (e.g., the subbands 702).

At step 1820, the method 1800 includes transmitting a communication configuration indicating a subset of the plurality of subbands based on a result of the CCA. The subset of the plurality of subbands can be used for at least one of a random access preamble signal transmission or a scheduling request transmission. In an embodiment, the method 1800 includes determining the subset of the plurality of subbands based on successful results from the CCAs and at least one of a network coverage, network traffic loading, interference coordination, or a quality of service (QoS) requirement for a plurality of wireless communication devices.

At step 1830, the method includes monitoring the subset of the plurality of subbands based on the communication configuration.

At step 1840, the method 1800 includes detecting a signal including at least one of a random access preamble sequence or a scheduling request from a second wireless communication device (e.g., the UEs 115 and 400) in at least one subband of the subset of the plurality of subbands based on the monitoring.

In an embodiment, the method 1800 includes transmitting a DRS using a plurality of discovery subbands. The DRS includes configuration information (e.g., MIB, SIB, RMSI, OSI) associated with a network operating in a spectrum shared by multiple network operating entities. For example, the plurality of subbands for the CCA can be selected from the plurality of discovery subbands.

In an embodiment, the plurality of subbands includes FDM resources (e.g., the resources 720) for random access by a plurality of wireless communication devices including the second wireless communication device. In an embodiment, the plurality of subbands includes FDM resources (e.g., the resources 720) for a plurality of UEs including the second wireless communication device to request for a scheduling grant.

In an embodiment, the signal is detected by receiving a portion of the signal from a first subband of the subset of the plurality of subbands and receiving another portion of the signal from a second subband of the subset of the plurality of subbands for which the CCA is successful. The first subband and the second subband are non-contiguous in frequency.

In an embodiment, the method 1800 includes detecting an identify of the second wireless communication device by applying joint processing on the portion of the signal received from first subband and the another portion of the signal received from the second subband.

In an embodiment, the communication configuration further indicates a plurality of interlaces (e.g., the interlaces 920) of frequency resources (e.g., the resources 902) in the plurality of subbands. In such an embodiment, the signal can be detected by receiving the signal from a first interlace (e.g., the frequency interlace 902a) of the plurality of interlaces. The first interlace includes frequency resources in the at least one subband.

In an embodiment, the communication configuration includes a power scaling configuration indicating a first power scaling factor for a transmission in a first time period (e.g., the time periods 704, 904, and 1204) and a second power scaling factor for a transmission in a second time period (e.g., the time periods 704, 904, and 1204) that is different from the first time period.

In an embodiment, the communication configuration further indicates a plurality of time periods. In such an embodiment, the signal can be detected by receiving the signal from the at least one subband during a first time period of the plurality of time periods (e.g., the time periods 904, and 1204) and receiving the signal from the at least one subband during a second time period of the plurality of time periods (e.g., as shown in the schemes 1000 and 1300). The first time period and the second time period are different.

In an embodiment, the communication configuration further indicates a plurality of time periods (e.g., the time periods 904 and 1204). The method 1800 can include detecting an identity of the second wireless communication device by applying joint processing on the signal received in the first time period and the signal received in the second time period.

In an embodiment, the communication configuration further indicates a plurality of time periods and a frequency hopping pattern. In such an embodiment, the signal can be detected by receiving the signal from the at least one subband based on the frequency hopping pattern during a first time period of the plurality of time periods and receiving the signal from another subband based on the frequency hopping pattern during a second time period of the plurality of time periods (e.g., as shown in the schemes 1100 and 1400). The first time period and the second time period are different.

In an embodiment, the signal can be detected by applying an OCC (e.g., the OCCs 1510 and 1610) in at least one of a time domain (e.g., as shown in the scheme 1600) or a frequency domain (e.g., as shown in the scheme 1500).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Further embodiments of the disclosure include a method of wireless communication, comprising receiving, by a first wireless communication device, a communication configuration indicating one or more subbands for transmitting a signal including at least one of a random access preamble sequence or a scheduling request; performing, by the first wireless communication device, a clear channel assessment (CCA) on each subband of the one or more subbands; and transmitting, by the first wireless communication device, the signal using at least one subband of the one or more subbands based on a result of the CCA.

In some embodiments, the method further comprises determining, by the first wireless communication device, a subset of the one or more subbands for which the CCA is successful; and selecting, by the first wireless communication device, the at least one subband from the subset of the one or more subbands. In some embodiments, wherein the selecting includes selecting the at least one subband based on at least one of an interference measurement, a channel measurement, or a power parameter of the first wireless communication device. In some embodiments, wherein the one or more subbands include frequency-division multiplexed resources for random access a plurality of wireless communication devices including the first wireless communication device. In some embodiments, wherein the one or more subbands include frequency-division multiplexed resources for a plurality of wireless communication devices including the first wireless communication device to request for a scheduling grant. In some embodiments, wherein the transmitting includes transmitting a portion of the signal using a first subband of the one or more subbands for which the CCA is successful; and transmitting another portion of the signal using a second subband of the one or more subbands for which the CCA is successful, and wherein the first subband and the second subband are non-contiguous in frequency. In some embodiments, wherein the communication configuration further indicates a plurality of interlaces of frequency resources in the one or more subbands, wherein the transmitting includes transmitting the signal using a first interlace of the plurality of interlaces, and wherein the first interlace includes frequency resources in the at least one subband. In some embodiments, wherein the communication configuration further indicates a power scaling configuration including different transmit power scaling factors for at least one of different time periods, different wireless communication devices, or different number of subbands, and wherein the transmitting includes transmitting the signal based on the power scaling configuration. In some embodiments, wherein the communication configuration further indicates a plurality of time periods, wherein the transmitting includes transmitting the signal using the at least one subband during a first time period of the plurality of time periods; and transmitting the signal using the at least one subband during a second time period of the plurality of time periods, and wherein the first time period and the second time period are different. In some embodiments, wherein the communication configuration further indicates a plurality of time periods and a frequency hopping pattern, wherein the transmitting includes transmitting the signal using the at least one subband based on the frequency hopping pattern during a first time period of the plurality of time periods; and transmitting the signal using another subband based on the frequency hopping pattern during a second time period of the plurality of time periods, and wherein the first time period and the second time period are different. In some embodiments, wherein the transmitting includes transmitting the signal based on an application of an orthogonal cover code (OCC) in at least one of a time domain or a frequency domain.

Further embodiments of the disclosure include a method of wireless communication, comprising performing, by a first wireless communication device, a clear channel assessment (CCA) on each subband of a plurality of subbands; transmitting, by the first wireless communication device, a communication configuration indicating a subset of the plurality of subbands based on a result of the CCA, the subset of the plurality of subbands for at least one of a random access preamble signal transmission or a scheduling request transmission; monitoring, by the first wireless communication device, the subset of the plurality of subbands based on the communication configuration; and detecting, by the first wireless communication device, a signal including at least one of a random access preamble sequence or a scheduling request from a second wireless communication device in at least one subband of the subset of the plurality of subbands based on the monitoring. In some embodiments, the method further comprises determining, by the first wireless communication device, the subset of the plurality of subbands based on successful results from the CCAs and at least one of a network coverage, network traffic loading, or a quality of service (QoS) requirement for a plurality of wireless communication devices. In some embodiments, the method further comprises transmitting, by the first wireless communication device, a discovery reference signal using a plurality of discovery subbands, the discovery reference signal including system configuration information associated with a network operating in a spectrum shared by multiple network operating entities; and selecting, by the first wireless communication device, the plurality of subbands for the CCA from the plurality of discovery subbands. In some embodiments, wherein the plurality of subbands includes frequency-division multiplexed resources for random access by a plurality of wireless communication devices including the second wireless communication device. In some embodiments, wherein the plurality of subbands includes frequency-division multiplexed resources for a plurality of wireless communication devices including the second wireless communication device to request for a scheduling grant. In some embodiments, wherein the detecting includes receiving a portion of the signal from a first subband of the subset of the plurality of subbands; and receiving another portion of the signal from a second subband of the subset of the plurality of subbands for which the CCA is successful, and wherein the first subband and the second subband are non-contiguous in frequency. In some embodiments, wherein the detecting includes detecting an identify of the second wireless communication device by applying joint processing on the portion of the signal received from first subband and the another portion of the signal received from the second subband. In some embodiments, wherein the communication configuration further indicates a plurality of interlaces of frequency resources in the plurality of subbands, wherein the detecting includes receiving the signal from a first interlace of the plurality of interlaces, and wherein the first interlace includes frequency resources in the at least one subband. In some embodiments, wherein the communication configuration further indicates a power scaling configuration including different transmit power scaling factors for at least one of different time periods, different wireless communication devices, or different number of subbands. In some embodiments, wherein the communication configuration further indicates a plurality of time periods, wherein the detecting includes receiving the signal from the at least one subband during a first time period of the plurality of time periods; and receiving the signal from the at least one subband during a second time period of the plurality of time periods, wherein the first time period and the second time period are different. In some embodiments, wherein the communication configuration further indicates a plurality of time periods, and wherein the detecting includes detecting an identity of the second wireless communication device by applying joint processing on the signal received in the first time period and the signal received in the second time period. In some embodiments, wherein the communication configuration further indicates a plurality of time periods and a frequency hopping pattern, wherein the detecting includes receiving the signal from the at least one subband based on the frequency hopping pattern during a first time period of the plurality of time periods; and receiving the signal from another subband based on the frequency hopping pattern during a second time period of the plurality of time periods, and wherein the first time period and the second time period are different. In some embodiments, wherein the detecting includes receiving the signal based on an application of an orthogonal cover code (OCC) in at least one of a time domain or a frequency domain.

Further embodiments of the disclosure include an apparatus comprising a transceiver (e.g., the transceiver 410) configured to receive a communication configuration indicating one or more subbands for transmitting a signal including at least one of a random access preamble sequence or a scheduling request; and transmit the signal using at least one subband of the one or more subbands based on a result of a clear channel assessment (CCA); and a processor (e.g., the processor 402 and/or the subband-based communication module 408) configured to perform the clear channel assessment (CCA) on each subband of the one or more subbands.

In some embodiments, wherein the processor is further configured to determine a subset of the one or more subbands for which the CCA is successful; and select the at least one subband from the subset of the one or more subbands. In some embodiments, wherein the at least one subband is selected based on at least one of an interference measurement, a channel measurement, or a power parameter of the apparatus. In some embodiments, wherein the one or more subbands include frequency-division multiplexed resources for random access a plurality of wireless communication devices including the apparatus. In some embodiments, wherein the one or more subbands include frequency-division multiplexed resources for a plurality of wireless communication devices including the apparatus to request for a scheduling grant. In some embodiments, wherein the transceiver is further configured to transmit the signal by transmitting a portion of the signal using a first subband of the one or more subbands for which the CCA is successful; and transmitting another portion of the signal using a second subband of the one or more subbands for which the CCA is successful, and wherein the first subband and the second subband are non-contiguous in frequency. In some embodiments, wherein the communication configuration further indicates a plurality of interlaces of frequency resources in the one or more subbands, wherein the transceiver is further configured to transmit the signal by: transmitting the signal using a first interlace of the plurality of interlaces, and wherein the first interlace includes frequency resources in the at least one subband. In some embodiments, wherein the communication configuration further indicates a power scaling configuration including different transmit power scaling factors for at least one of different time periods, different wireless communication devices, or different number of subbands, and wherein the transceiver is further configured to transmit the signal based on the power scaling configuration. In some embodiments, wherein the communication configuration further indicates a plurality of time periods, wherein the transceiver is further configured to transmit the signal by transmitting the signal using the at least one subband during a first time period of the plurality of time periods; and transmitting the signal using the at least one subband during a second time period of the plurality of time periods, and wherein the first time period and the second time period are different. In some embodiments, wherein the communication configuration further indicates a plurality of time periods and a frequency hopping pattern, wherein the transceiver is further configured to transmit the signal by transmitting the signal using the at least one subband based on the frequency hopping pattern during a first time period of the plurality of time periods; and transmitting the signal using another subband based on the frequency hopping pattern during a second time period of the plurality of time periods, and wherein the first time period and the second time period are different. In some embodiments, wherein the transceiver is further configured to transmit the signal based on an application of an orthogonal cover code (OCC) in at least one of a time domain or a frequency domain.

Further embodiments of the disclosure include an apparatus comprising a transceiver (e.g., the transceiver 510) configured to transmit a communication configuration indicating a subset of a plurality of subbands based on a result of a clear channel assessment (CCA), the subset of the plurality of subbands for at least one of a random access preamble signal transmission or a scheduling request transmission; and a processor (e.g., the processor 502 and/or subband-based communication module 508) configured to perform the CCA on each subband of a plurality of subbands; monitor the subset of the plurality of subbands based on the communication configuration; and detect a signal including at least one of a random access preamble sequence or a scheduling request from a second wireless communication device in at least one subband of the subset of the plurality of subbands based on the monitoring.

In some embodiments, wherein the processor is further configured to determine the subset of the plurality of subbands based on successful results from the CCAs and at least one of a network coverage, network traffic loading, or a quality of service (QoS) requirement for a plurality of wireless communication devices. In some embodiments, wherein the transceiver is further configured to transmit a discovery reference signal using a plurality of discovery subbands, the discovery reference signal including system configuration information associated with a network operating in a spectrum shared by multiple network operating entities, and wherein the processor is further configured to select the plurality of subbands for the CCA from on the plurality of discovery subbands. In some embodiments, wherein the plurality of subbands includes frequency-division multiplexed resources for random access by a plurality of wireless communication devices including the second wireless communication device. In some embodiments, wherein the plurality of subbands includes frequency-division multiplexed resources for a plurality of wireless communication devices including the second wireless communication device to request for a scheduling grant. In some embodiments, wherein the processor is further configured to detect the signal by receiving a portion of the signal from a first subband of the subset of the plurality of subbands; and receiving another portion of the signal from a second subband of the subset of the plurality of subbands for which the CCA is successful, and wherein the first subband and the second subband are non-contiguous in frequency. In some embodiments, wherein the processor is further configured to detect the signal by detecting an identify of the second wireless communication device by applying joint processing on the portion of the signal received from first subband and the another portion of the signal received from the second subband. In some embodiments, wherein the communication configuration further indicates a plurality of interlaces of frequency resources in the plurality of subbands, wherein the processor is further configured to detect the signal by receiving the signal from a first interlace of the plurality of interlaces, and wherein the first interlace includes frequency resources in the at least one subband. In some embodiments, wherein the communication configuration further indicates a power scaling configuration including different transmit power scaling factors for at least one of different time periods, different wireless communication devices, or different number of subbands. In some embodiments, wherein the communication configuration further indicates a plurality of time periods, wherein the processor is further configured to detect the signal by receiving the signal from the at least one subband during a first time period of the plurality of time periods; and receiving the signal from the at least one subband during a second time period of the plurality of time periods, wherein the first time period and the second time period are different. In some embodiments, wherein the communication configuration further indicates a plurality of time periods, and wherein the processor is further configured to detect the signal by detecting an identity of the second wireless communication device by applying joint processing on the signal received in the first time period and the signal received in the second time period. In some embodiments, wherein the communication configuration further indicates a plurality of time periods and a frequency hopping pattern, wherein the processor is further configured to detect the signal by receiving the signal from the at least one subband based on the frequency hopping pattern during a first time period of the plurality of time periods; and receiving the signal from another subband based on the frequency hopping pattern during a second time period of the plurality of time periods, and wherein the first time period and the second time period are different. In some embodiments, wherein the processor is further configured to detect the signal receiving the signal based on an application of an orthogonal cover code (OCC) in at least one of a time domain or a frequency domain.

Further embodiments of the disclosure include a computer-readable medium having program code recorded thereon, the program code comprising code for causing a first wireless communication device to receive a communication configuration indicating one or more subbands for transmitting a signal including at least one of a random access preamble sequence or a scheduling request; code for causing the first wireless communication device to perform a clear channel assessment (CCA) on each subband of the one or more subbands; and code for causing the first wireless communication device to transmit the signal using at least one subband of the one or more subbands based on a result of the CCA.

In some embodiments, the computer-readable medium further comprises code for causing the first wireless communication device to determine a subset of the one or more subbands for which the CCA is successful; and code for causing the first wireless communication device to select the at least one subband from the subset of the one or more subbands. In some embodiments, wherein the code for causing the first wireless communication device to select the at least one subband is further configured to select the at least one subband based on at least one of an interference measurement, a channel measurement, or a power parameter of the first wireless communication device. In some embodiments, wherein the one or more subbands include frequency-division multiplexed resources for random access a plurality of wireless communication devices including the first wireless communication device. In some embodiments, wherein the one or more subbands include frequency-division multiplexed resources for a plurality of wireless communication devices including the first wireless communication device to request for a scheduling grant. In some embodiments, wherein the code for causing the first wireless communication device to transmit the signal is further configured to transmit a portion of the signal using a first subband of the one or more subbands for which the CCA is successful; and transmit another portion of the signal using a second subband of the one or more subbands for which the CCA is successful, and wherein the first subband and the second subband are non-contiguous in frequency. In some embodiments, wherein the communication configuration further indicates a plurality of interlaces of frequency resources in the one or more subbands, wherein the code for causing the first wireless communication device to transmit the signal is further configured to transmit the signal using a first interlace of the plurality of interlaces, and wherein the first interlace includes frequency resources in the at least one subband. In some embodiments, wherein the communication configuration further indicates a power scaling configuration including different transmit power scaling factors for at least one of different time periods, different wireless communication devices, or different number of subbands, and wherein the code for causing the first wireless communication device to transmit the signal is further configured to transmit the signal based on the power scaling configuration. In some embodiments, wherein the communication configuration further indicates a plurality of time periods, wherein the code for causing the first wireless communication device to transmit the signal is further configured to transmit the signal using the at least one subband during a first time period of the plurality of time periods; and transmit the signal using the at least one subband during a second time period of the plurality of time periods, and wherein the first time period and the second time period are different. In some embodiments, wherein the communication configuration further indicates a plurality of time periods and a frequency hopping pattern, wherein the code for causing the first wireless communication device to transmit the signal is further configured to transmit the signal using the at least one subband based on the frequency hopping pattern during a first time period of the plurality of time periods; and transmit the signal using another subband based on the frequency hopping pattern during a second time period of the plurality of time periods, and wherein the first time period and the second time period are different. In some embodiments, wherein the code for causing the first wireless communication device to transmit the signal is further configured to transmit the signal based on an application of an orthogonal cover code (OCC) in at least one of a time domain or a frequency domain.

Further embodiments of the disclosure include a computer-readable medium of wireless communication, comprising code for causing a first wireless communication device to perform a clear channel assessment (CCA) on each subband of a plurality of subbands; code for causing the first wireless communication device to transmit a communication configuration indicating a subset of the plurality of subbands based on a result of the CCA, the subset of the plurality of subbands for at least one of a random access preamble signal transmission or a scheduling request transmission; code for causing the first wireless communication device to monitor the subset of the plurality of subbands based on the communication configuration; and code for causing the first wireless communication device to detect a signal including at least one of a random access preamble sequence or a scheduling request from a second wireless communication device in at least one subband of the subset of the plurality of subbands based on the monitoring.

In some embodiments, the computer-readable medium further comprises code for causing the first wireless communication device to determine the subset of the plurality of subbands based on successful results from the CCAs and at least one of a network coverage, network traffic loading, or a quality of service (QoS) requirement for a plurality of wireless communication devices. In some embodiments, the computer-readable medium further comprises code for causing the first wireless communication device to transmit a discovery reference signal using a plurality of discovery subbands, the discovery reference signal including system configuration information associated with a network operating in a spectrum shared by multiple network operating entities; and code for causing the first wireless communication device to select the plurality of subbands for the CCA from the plurality of discovery subbands. In some embodiments, wherein the plurality of subbands includes frequency-division multiplexed resources for random access by a plurality of wireless communication devices including the second wireless communication device. In some embodiments, wherein the plurality of subbands includes frequency-division multiplexed resources for a plurality of wireless communication devices including the second wireless communication device to request for a scheduling grant. In some embodiments, wherein the code for causing the first wireless communication device to detect the signal is further configured to receive a portion of the signal from a first subband of the subset of the plurality of subbands; and receive another portion of the signal from a second subband of the subset of the plurality of subbands for which the CCA is successful, and wherein the first subband and the second subband are non-contiguous in frequency. In some embodiments, wherein the code for causing the first wireless communication device to detect the signal is further configured to detect an identity of the second wireless communication device by applying joint processing on the portion of the signal received from first subband and the another portion of the signal received from the second subband. In some embodiments, wherein the communication configuration further indicates a plurality of interlaces of frequency resources in the plurality of subbands, wherein the code for causing the first wireless communication device to detect the signal is further configured to receive the signal from a first interlace of the plurality of interlaces, and wherein the first interlace includes frequency resources in the at least one subband. In some embodiments, wherein the communication configuration further indicates a power scaling configuration including different transmit power scaling factors for at least one of different time periods, different wireless communication devices, or different number of subbands. In some embodiments, wherein the communication configuration further indicates a plurality of time periods, wherein the code for causing the first wireless communication device to detect the signal is further configured to receive the signal from the at least one subband during a first time period of the plurality of time periods; and receive the signal from the at least one subband during a second time period of the plurality of time periods, wherein the first time period and the second time period are different. In some embodiments, wherein the communication configuration further indicates a plurality of time periods, and wherein the code for causing the first wireless communication device to detect the signal is further configured to detect an identity of the second wireless communication device by applying joint processing on the signal received in the first time period and the signal received in the second time period. In some embodiments, wherein the communication configuration further indicates a plurality of time periods and a frequency hopping pattern, wherein the code for causing the first wireless communication device to detect the signal is further configured to receive the signal from the at least one subband based on the frequency hopping pattern during a first time period of the plurality of time periods; and receive the signal from another subband based on the frequency hopping pattern during a second time period of the plurality of time periods, and wherein the first time period and the second time period are different. In some embodiments, wherein the code for causing the first wireless communication device to detect the signal is further configured to receive the signal based on an application of an orthogonal cover code (OCC) in at least one of a time domain or a frequency domain.

Further embodiments of the disclosure include an apparatus comprising means for receiving a communication configuration indicating one or more subbands for transmitting a signal including at least one of a random access preamble sequence or a scheduling request; means for performing a clear channel assessment (CCA) on each subband of the one or more subbands; and means for transmitting the signal using at least one subband of the one or more subbands based on a result of the CCA.

In some embodiments, the apparatus further comprises means for determining a subset of the one or more subbands for which the CCA is successful; and means for selecting the at least one subband from the subset of the one or more subbands. In some embodiments, wherein the means for selecting the at least one subband is further configured to select the at least one subband based on at least one of an interference measurement, a channel measurement, or a power parameter of the apparatus. In some embodiments, wherein the one or more subbands include frequency-division multiplexed resources for random access a plurality of wireless communication devices including the apparatus. In some embodiments, wherein the one or more subbands include frequency-division multiplexed resources for a plurality of wireless communication devices including the apparatus to request for a scheduling grant. In some embodiments, wherein the means for transmitting the signal is further configured to transmit a portion of the signal using a first subband of the one or more subbands for which the CCA is successful; and transmit another portion of the signal using a second subband of the one or more subbands for which the CCA is successful, and wherein the first subband and the second subband are non-contiguous in frequency. In some embodiments, wherein the communication configuration further indicates a plurality of interlaces of frequency resources in the one or more subbands, wherein the means for transmitting the signal is further configured to transmit the signal using a first interlace of the plurality of interlaces, and wherein the first interlace includes frequency resources in the at least one subband. In some embodiments, wherein the communication configuration further indicates a power scaling configuration including different transmit power scaling factors for at least one of different time periods, different wireless communication devices, or different number of subbands, and wherein the means for transmitting the signal is further configured to transmit the signal based on the power scaling configuration. In some embodiments, wherein the communication configuration further indicates a plurality of time periods, wherein the means for transmitting the signal is further configured to transmit the signal using the at least one subband during a first time period of the plurality of time periods; and transmit the signal using the at least one subband during a second time period of the plurality of time periods, and wherein the first time period and the second time period are different. In some embodiments, wherein the communication configuration further indicates a plurality of time periods and a frequency hopping pattern, wherein the means for transmitting the signal is further configured to transmit the signal using the at least one subband based on the frequency hopping pattern during a first time period of the plurality of time periods; and transmit the signal using another subband based on the frequency hopping pattern during a second time period of the plurality of time periods, and wherein the first time period and the second time period are different. In some embodiments, wherein the means for transmitting the signal is further configured to transmit the signal based on an application of an orthogonal cover code (OCC) in at least one of a time domain or a frequency domain.

Further embodiments of the disclosure include an apparatus comprising means for performing a clear channel assessment (CCA) on each subband of a plurality of subbands; means for transmitting a communication configuration indicating a subset of the plurality of subbands based on a result of the CCA, the subset of the plurality of subbands for at least one of a random access preamble signal transmission or a scheduling request transmission; means for monitoring the subset of the plurality of subbands based on the communication configuration; and means for detecting a signal including at least one of a random access preamble sequence or a scheduling request from a second wireless communication device in at least one subband of the subset of the plurality of subbands based on the monitoring.

In some embodiments, the apparatus further comprises means for determining the subset of the plurality of subbands based on successful results from the CCAs and at least one of a network coverage, network traffic loading, or a quality of service (QoS) requirement for a plurality of wireless communication devices. In some embodiments, the apparatus further comprises means for transmitting a discovery reference signal using a plurality of discovery subbands, the discovery reference signal including system configuration information associated with a network operating in a spectrum shared by multiple network operating entities; and means for selecting the plurality of subbands for the CCA from the plurality of discovery subbands. In some embodiments, wherein the plurality of subbands includes frequency-division multiplexed resources for random access by a plurality of wireless communication devices including the second wireless communication device. In some embodiments, wherein the plurality of subbands includes frequency-division multiplexed resources for a plurality of wireless communication devices including the second wireless communication device to request for a scheduling grant. In some embodiments, wherein the means for detecting the signal is further configured to receive a portion of the signal from a first subband of the subset of the plurality of subbands; and receive another portion of the signal from a second subband of the subset of the plurality of subbands for which the CCA is successful, and wherein the first subband and the second subband are non-contiguous in frequency. In some embodiments, wherein the means for detecting the signal is further configured to detect an identity of the second wireless communication device by applying joint processing on the portion of the signal received from first subband and the another portion of the signal received from the second subband. In some embodiments, wherein the communication configuration further indicates a plurality of interlaces of frequency resources in the plurality of subbands, wherein the means for detecting the signal is further configured to receive the signal from a first interlace of the plurality of interlaces, and wherein the first interlace includes frequency resources in the at least one subband. In some embodiments, wherein the communication configuration further indicates a power scaling configuration including different transmit power scaling factors for at least one of different time periods, different wireless communication devices, or different number of subbands. In some embodiments, wherein the communication configuration further indicates a plurality of time periods, wherein the means for detecting the signal is further configured to receive the signal from the at least one subband during a first time period of the plurality of time periods; and receive the signal from the at least one subband during a second time period of the plurality of time periods, wherein the first time period and the second time period are different. In some embodiments, wherein the communication configuration further indicates a plurality of time periods, and wherein the means for detecting the signal is further configured to detect an identity of the second wireless communication device by applying joint processing on the signal received in the first time period and the signal received in the second time period. In some embodiments, wherein the communication configuration further indicates a plurality of time periods and a frequency hopping pattern, wherein the means for detecting the signal is further configured to receiving the signal from the at least one subband based on the frequency hopping pattern during a first time period of the plurality of time periods; and receiving the signal from another subband based on the frequency hopping pattern during a second time period of the plurality of time periods, and wherein the first time period and the second time period are different. In some embodiments, wherein the means for detecting the signal is further configured to receive the signal based on an application of an orthogonal cover code (OCC) in at least one of a time domain or a frequency domain.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a user equipment (UE) from a base station (BS), a communication configuration, the communication configuration indicating one or more subbands of a plurality of subbands less than all of the plurality of subbands cleared for transmitting a signal including at least one of a random access preamble sequence or a scheduling request based on a first clear channel assessment (CCA) associated with the BS;
performing, by the UE, a second CCA on each subband of the one or more subbands cleared for transmitting the signal including the at least one of the random access preamble sequence or the scheduling request; and
transmitting, by the UE to the BS, the signal using at least one subband of the one or more subbands based on a result of the second CCA.

2. The method of claim 1, further comprising:
determining, by the UE, a subset of the one or more subbands for which the second CCA is successful; and
selecting, by the UE, the at least one subband from the subset of the one or more subbands.

3. The method of claim 2, wherein the selecting includes selecting the at least one subband based on at least one of an interference measurement, a channel measurement, or a power parameter of the UE.

4. The method of claim 1, wherein the one or more subbands include at least one of:
frequency-division multiplexed resources for random access by a plurality of wireless communication devices including the UE; or
frequency-division multiplexed resources for a plurality of wireless communication devices including the UE to request for a scheduling grant.

5. The method of claim 1, wherein the transmitting includes:
transmitting a portion of the signal using a first subband of the one or more subbands for which the second CCA is successful; and
transmitting another portion of the signal using a second subband of the one or more subbands for which the second CCA is successful, and
wherein the first subband and the second subband are non-contiguous in frequency.

6. The method of claim 1, wherein the communication configuration further indicates a plurality of interlaces of frequency resources in the one or more subbands, wherein the transmitting includes transmitting the signal using a first interlace of the plurality of interlaces, and wherein the first interlace includes frequency resources in the at least one subband.

7. The method of claim 1, wherein the communication configuration further indicates a power scaling configuration including different transmit power scaling factors for at least one of different time periods, different wireless communication devices, or different number of subbands, and wherein the transmitting includes transmitting the signal based on the power scaling configuration.

8. The method of claim 1, wherein the communication configuration further indicates a plurality of time periods, wherein the transmitting includes:
transmitting the signal using the at least one subband during a first time period of the plurality of time periods; and
transmitting the signal using the at least one subband during a second time period of the plurality of time periods, and wherein the first time period and the second time period are different.

9. The method of claim 1, wherein the communication configuration further indicates a plurality of time periods and a frequency hopping pattern, wherein the transmitting includes:
transmitting the signal using the at least one subband based on the frequency hopping pattern during a first time period of the plurality of time periods; and
transmitting the signal using another subband based on the frequency hopping pattern during a second time period of the plurality of time periods, and wherein the first time period and the second time period are different.

10. The method of claim 1, wherein the transmitting includes transmitting the signal based on an application of an orthogonal cover code (OCC) in at least one of a time domain or a frequency domain.

11. A method of wireless communication, comprising:
performing, by a base station (BS), a clear channel assessment (CCA) on each subband of a plurality of subbands, wherein a first subset of the plurality of subbands are cleared for transmission by the CCA;
determining, by the BS based on at least one of network traffic loading or a quality of service (QoS) requirement for a plurality of wireless communication devices, a second subset of the plurality of subbands for at least one of a random access preamble signal transmission or a scheduling request transmission, the second subset of the plurality of subbands being determined from the first subset of the plurality of subbands cleared for transmission by the CCA;
transmitting, by the BS, a communication configuration indicating the second subset of the plurality of subbands cleared for the at least one of the random access preamble signal transmission or the scheduling request transmission;
monitoring, by the BS, for a signal in the second subset of the plurality of subbands based on the first subset of the plurality of subbands being cleared for transmission by the CCA; and
detecting, by the BS, a signal including at least one of a random access preamble sequence or a scheduling request from a UE in at least one subband of the second subset of the plurality of subbands based on the monitoring.

12. The method of claim 11, further comprising:
transmitting, by the BS, a discovery reference signal using a plurality of discovery subbands, the discovery reference signal including system configuration information associated with a network operating in a spectrum shared by multiple network operating entities; and
selecting, by the BS, the plurality of subbands for the CCA from the plurality of discovery subbands.

13. The method of claim 11, wherein the plurality of subbands includes at least one of:
frequency-division multiplexed resources for random access by a plurality of wireless communication devices including the UE; or frequency-division multiplexed resources for a plurality of wireless communication devices including the UE to request for a scheduling grant.

14. The method of claim 11, wherein the detecting includes:
receiving a portion of the signal from a first subband of the second subset of the plurality of subbands; and
receiving another portion of the signal from a second subband of the second subset of the plurality of subbands, and
wherein the first subband and the second subband are non-contiguous in frequency.

15. The method of claim 14, wherein the detecting includes:
detecting an identity of the UE by applying joint processing on the portion of the signal received from first subband and the another portion of the signal received from the second subband.

16. The method of claim 11, wherein the communication configuration further indicates a plurality of interlaces of frequency resources in the plurality of subbands, wherein the detecting includes receiving the signal from a first interlace of the plurality of interlaces, and wherein the first interlace includes frequency resources in the at least one subband.

17. The method of claim 11, wherein the communication configuration further indicates a power scaling configuration including different transmit power scaling factors for at least one of different time periods, different wireless communication devices, or different number of subbands.

18. The method of claim 11, wherein the communication configuration further indicates a plurality of time periods, wherein the detecting includes:
receiving the signal from the at least one subband during a first time period of the plurality of time periods; and
receiving the signal from the at least one subband during a second time period of the plurality of time periods, wherein the first time period and the second time period are different.

19. The method of claim 18, wherein the communication configuration further indicates a plurality of time periods, and wherein the detecting includes:
detecting an identity of the UE by applying joint processing on the signal received in the first time period and the signal received in the second time period.

20. The method of claim 11, wherein the communication configuration further indicates a plurality of time periods and a frequency hopping pattern, wherein the detecting includes:
receiving the signal from the at least one subband based on the frequency hopping pattern during a first time period of the plurality of time periods; and
receiving the signal from another subband based on the frequency hopping pattern during a second time period of the plurality of time periods, and wherein the first time period and the second time period are different.

21. The method of claim 11, wherein the detecting includes receiving the signal based on an application of an orthogonal cover code (OCC) in at least one of a time domain or a frequency domain.

22. A user equipment (UE) comprising:
a transceiver configured to:
receive, from a base station (BS), a communication configuration, the communication configuration indicating one or more subbands of a plurality of subbands less than all of the plurality of subbands cleared for transmitting a signal including at least one of a random access preamble sequence or a scheduling request based on a first clear channel assessment (CCA) associated with the BS; and
transmit, to the BS, the signal using at least one subband of the one or more subbands based on a result of a second CCA; and
a processor configured to perform the second CCA on each subband of the one or more subbands cleared for transmitting the signal including the at least one of the random access preamble sequence or the scheduling request.

23. The UE of claim 22, wherein the processor is further configured to:
determine a subset of the one or more subbands for which the second CCA is successful; and
select the at least one subband from the subset of the one or more subbands.

24. The UE of claim 23, wherein the at least one subband is selected based on at least one of an interference measurement, a channel measurement, or a power parameter of the UE.

25. The UE of claim 22, wherein the one or more subbands include at least one of:
frequency-division multiplexed resources for random access by a plurality of wireless communication devices including the UE; or
frequency-division multiplexed resources for a plurality of wireless communication devices including the UE to request for a scheduling grant.

26. A base station (BS) comprising:
a memory;
a transceiver; and
at least one processor coupled to the memory and the transceiver, wherein the BS is configured to:
perform a clear channel assessment (CCA) on each subband of a plurality of subbands, wherein a first subset of the plurality of subbands are cleared for transmission by the CCA;
determine, based on at least one of network traffic loading or a quality of service (QoS) requirement for a plurality of wireless communication devices, a second subset of the plurality of subbands for at least one of a random access preamble signal transmission or a scheduling request transmission, the second subset of the plurality of subbands being determined from the first set of the plurality of subbands cleared for transmission by the CCA;
transmit a communication configuration indicating the second subset of the plurality of subbands cleared for the at least one of the random access preamble signal transmission or the scheduling request transmission;
monitor for a signal in the second subset of the plurality of subbands based on the first subset of the plurality of subbands being cleared for transmission by the CCA; and
detect a signal including at least one of a random access preamble sequence or a scheduling request from a user equipment (UE) in at least one subband of the second subset of the plurality of subbands based on the monitoring.

27. The BS of claim 26, wherein the BS is further configured to:
transmit a discovery reference signal using a plurality of discovery subbands, the discovery reference signal including system configuration information associated with a network operating in a spectrum shared by multiple network operating entities; and select the plurality of subbands for the CCA from the plurality of discovery subbands.

28. The BS of claim 26, wherein the plurality of subbands includes at least one of:
- frequency-division multiplexed resources for random access by a plurality of wireless communication devices including the UE; or
- frequency-division multiplexed resources for a plurality of wireless communication devices including the UE to request for a scheduling grant.

* * * * *